US012052081B2

United States Patent
Wu et al.

(10) Patent No.: US 12,052,081 B2
(45) Date of Patent: Jul. 30, 2024

(54) ANTENNA SWITCHING IN FREQUENCY BANDS WITH POWER SPECTRAL DENSITY (PDS) LIMITS

(71) Applicant: QUALCOMM Incorporated, San Diego, CA (US)

(72) Inventors: Kanke Wu, San Diego, CA (US); Bin Tian, San Diego, CA (US); Tevfik Yucek, San Jose, CA (US); Lin Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 17/820,006

(22) Filed: Aug. 16, 2022

(65) Prior Publication Data

US 2024/0063876 A1      Feb. 22, 2024

(51) Int. Cl.
*H04B 7/06*      (2006.01)
*H04L 5/00*      (2006.01)

(52) U.S. Cl.
CPC ......... *H04B 7/0691* (2013.01); *H04L 5/0098* (2013.01)

(58) Field of Classification Search
CPC ............................. H04B 7/0691; H04L 5/0098
(Continued)

(56) References Cited

U.S. PATENT DOCUMENTS 8,787,479 B2 * 7/2014 Rouquette-Leveil ........................
H04L 1/0071
375/267

8,971,210 B1 * 3/2015 Murali ................ H04B 7/0413
370/338
(Continued)

FOREIGN PATENT DOCUMENTS

AU      2011378436 A1 *  4/2014  ........... H04B 7/0697
CN      114051260 A    *  2/2022
(Continued)

OTHER PUBLICATIONS

Partial International Search Report - PCT/US2023/070588—ISA/EPO—Nov. 28, 2023.
(Continued)

*Primary Examiner* — Emmanuel Bayard
(74) *Attorney, Agent, or Firm* — Kevin M. Donnelly; Holland & Hart LLP

(57) ABSTRACT

This disclosure provides methods, devices and systems for improving wireless communications in power spectral density (PSD)-limited frequency bands. A wireless communication device, having a number ($N_{TX}$) of transmit antennas, parses a physical layer (PHY) protocol data unit (PPDU) into a number ($N_{SS}$) of spatial streams and modulates the $N_{SS}$ spatial streams on a number (M) of subcarriers. In some implementations, the wireless communication device may transmit the PPDU using a number (N) of the transmit antennas, where $N_{SS} \leq N < N_{TX}$. In some other implementations, the wireless communication device may subdivide the M subcarriers into subcarrier groups and may transmit each subcarrier group using a respective subset of the $N_{TX}$ transmit antennas, where the number of transmit antennas used to transmit each subcarrier group is greater than or equal to the number of spatial streams modulated on the subcarriers in the group but less than $N_{TX}$.

30 Claims, 14 Drawing Sheets

(58) Field of Classification Search
USPC .......................................... 375/267, 299, 347
See application file for complete search history.

(56) References Cited

U.S. PATENT DOCUMENTS

| | | | |
|---|---|---|---|
| 10,135,582 B1* | 11/2018 | Sun .................... | H04L 1/1825 |
| 2007/0086539 A1* | 4/2007 | Hocevar ............... | H04L 1/0068 |
| | | | 375/267 |
| 2007/0136635 A1* | 6/2007 | Niu .................... | H03M 13/1185 |
| | | | 714/752 |
| 2008/0101502 A1* | 5/2008 | Navidpour ......... | H04L 27/2623 |
| | | | 375/296 |
| 2012/0076173 A1 | 3/2012 | Chang et al. | |
| 2018/0160429 A1* | 6/2018 | Seok .................... | H04L 1/0075 |
| 2019/0036642 A1* | 1/2019 | Huang ................ | H04B 7/0413 |
| 2020/0028558 A1 | 1/2020 | Yerramalli et al. | |
| 2021/0288752 A1* | 9/2021 | Suh .................... | H04L 1/0058 |
| 2021/0289500 A1 | 9/2021 | Yang et al. | |
| 2021/0344541 A1 | 11/2021 | Shellhammer et al. | |
| 2022/0060365 A1* | 2/2022 | Zhan ................... | H04L 25/022 |
| 2022/0385518 A1* | 12/2022 | Xin ..................... | H04B 7/0697 |
| 2022/0416988 A1* | 12/2022 | Cao .................... | H04L 5/0044 |

FOREIGN PATENT DOCUMENTS

| | | | | |
|---|---|---|---|---|
| EP | 4213424 A1 | 7/2023 | | |
| WO | WO-2009054938 A1 | 4/2009 | | |
| WO | WO-2013119829 A1 * | 8/2013 | ........... | H04L 27/261 |
| WO | WO-2022029717 A1 | 2/2022 | | |
| WO | WO-2022082689 A1 | 4/2022 | | |
| WO | WO-2023154084 A1 * | 8/2023 | | |

OTHER PUBLICATIONS

International Search Report and Written Opinion—PCT/US2023/070588—ISA/EPO—Mar. 4, 2024.

* cited by examiner

ANTENNA SWITCHING IN FREQUENCY BANDS WITH POWER SPECTRAL DENSITY (PDS) LIMITS

TECHNICAL FIELD

This disclosure relates generally to wireless communication, and more specifically, to antenna switching in frequency bands with power spectral density (PSD) limits.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some instances, APs and STAs may be subject to power spectral density (PSD) limits. For example, some APs and STAs that operate in the 6 gigahertz (GHz) frequency band may be required to conform to a low power indoor (LPI) power class, which limits the transmit power of APs and STAs (in the 6 GHz band) to 5 decibel-milliwatts per megahertz (dBm/MHz) and −1 dBm/MHz, respectively. When wireless signals are transmitted via multiple transmit antennas (such as an antenna array), the energy radiated in the strongest beam direction must not exceed the PSD limit. Such limits on directional gains apply to beamformed transmissions as well as to open loop transmissions using multiple transmit antennas (which can result in unintentional beamforming in one or more directions). As a result, PSD limits can undesirably reduce the range of wireless communications and may reduce packet detection and channel estimation capabilities of APs and STAs.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device having a number ($N_{TX}$) of transmit antennas, and may include parsing a physical layer (PHY) protocol data unit (PPDU) into a number ($N_{SS}$) of spatial streams, where $N_{SS} \geq 1$; modulating the $N_{SS}$ spatial streams on a number (M) of subcarriers spanning a bandwidth associated with a wireless channel; mapping the M subcarriers to a number (N) of the transmit antennas based on a power spectral density (PSD) limit associated with the wireless channel, where $N_{SS} \leq N < N_{TX}$; and transmitting the PPDU to a receiving device via the N transmit antennas based on the mapping of the M subcarriers. In some implementations, N may be equal to $N_{SS}$.

In some aspects, the method may further include receiving antenna selection information from the receiving device indicating the N transmit antennas. In some other aspects, the mapping of the M subcarriers to the N transmit antennas may be further based on a lookup table that indicates the N transmit antennas to be used for transmitting $N_{SS}$ spatial streams. In some other aspects, the mapping of the M subcarriers to the N transmit antennas may be further based on a lookup table that stores historical data associated with previous transmissions by the wireless communication device.

Still further, in some aspects, the method may further include receiving channel state information (CSI) from the receiving device, where the M subcarriers are mapped to the N transmit antennas based on the received CSI. In some implementations, the N transmit antennas may be associated with the N highest signal-to-noise ratios (SNRs) or the N highest signal-to-interference-plus-noise ratios (SINRs) indicated by the received CSI. In some implementation, the N transmit antennas may be associated with the highest channel gains indicated by the received CSI.

In some implementations, the N transmit antennas may include a first transmit antenna associated with the highest channel gain indicated by the received CSI and a second transmit antenna having the lowest correlation, among the $N_{TX}$ transmit antennas, with the first transmit antenna. In some implementations, the N transmit antennas may further include a third transmit antenna having the lowest correlation, among the $N_{TX}$ transmit antennas, with the first and second transmit antennas.

In some implementations, the N transmit antennas may include a first transmit antenna associated with the highest channel gain indicated by the received CSI and a second transmit antenna associated with the highest channel gain, indicated by the received CSI, in a direction orthogonal to the first transmit antenna. In some implementations, the N transmit antennas may further include a third transmit antenna having the highest channel gain, indicated by the received CSI, in a direction orthogonal to the first and second transmit antennas.

Another innovative aspect of the subject matter described in this disclosure can be implemented in a wireless communication device. In some implementations, the wireless communication device may include a number ($N_{TX}$) of transmit antennas, at least one memory, and at least one processor communicatively coupled with the at least one memory and configured to cause the wireless communication device to perform operations including parsing a PPDU into a number ($N_{SS}$) of spatial streams, where $N_{SS} \geq 1$; modulating the $N_{SS}$ spatial streams on a number (M) of subcarriers spanning a bandwidth associated with a wireless channel; mapping the M subcarriers to a number (N) of the transmit antennas based on a PSD limit associated with the wireless channel, where $N_{SS} \leq N < N_{TX}$; and transmitting the PPDU to a receiving device via the N transmit antennas based on the mapping of the M subcarriers.

Another innovative aspect of the subject matter described in this disclosure can be implemented as a method of wireless communication. The method may be performed by a wireless communication device and may include parsing a PPDU into a number ($N_{SS}$) of spatial streams, where $N_{SS} \geq 1$; modulating the $N_{SS}$ spatial streams on a number (M) of subcarriers spanning a bandwidth associated with a wireless channel; mapping a first subset of the M subcarriers to a number (K) of the transmit antennas based on a number ($N_{SS1}$) of the spatial streams modulated on the first subset of the M subcarriers, where $N_{SS1} \leq K < N_{TX}$; mapping a second subset of the M subcarriers to a number (L) of the transmit antennas based on a number ($N_{SS2}$) of the spatial streams modulated on the second subset of the M subcarriers, where $N_{SS2} \leq L < N_{TX}$; transmitting a first portion of the PPDU to a receiving device via the K transmit antennas based on the mapping of the first subset of the M subcarriers; and transmitting a second portion of the PPDU to the receiving device via the L transmit antennas based on the mapping of the second subset of the M subcarriers.

In some implementations, K may be equal to $N_{SS1}$ and L may be equal to $N_{SS2}$. In some implementations, the K transmit antennas may be different than the L transmit antennas. In some implementations, the mapping of the first and second subsets of the M subcarriers to the K and L transmit antennas, respectively, may be further based on a PSD limit associated with the wireless channel.

In some implementations, subcarriers belonging to the first subset of the M subcarriers may be exclusive to the first subset and subcarriers belonging to the second subset of the M subcarriers may be exclusive to the second subset. In some implementations, the first subset of the M subcarriers may represent one or more first resource units (RUs) and the second subset of the M subcarriers represents one or more second RUs. In some implementations, the first subset of the M subcarriers may include a different number of subcarriers than the second subset of the M subcarriers.

In some aspects, the method may further include receiving antenna selection information from the receiving device indicating the K transmit antennas or the L transmit antennas. In some other aspects, the mapping of the first or second subsets of the M subcarriers to the K or L transmit antennas, respectively, may be further based on a lookup table that indicates the K transmit antennas to be used for transmitting $N_{SS1}$ spatial streams and the L transmit antennas to be used for transmitting $N_{SS2}$ spatial streams. In some other aspects, the mapping of the first or second subsets of the M subcarriers to the K or L transmit antennas, respectively, may be further based on a lookup table that stores historical data associated with previous transmissions by the wireless communication device.

Still further, in some aspects, the method may further include receiving CSI from the receiving device, where the mapping of the first or second subsets of the M subcarriers to the K or L transmit antennas, respectively, is further based on the received CSI. In some implementations, the mapping of the first subset of the M subcarriers to the K transmit antennas may be based on a lookup table and the mapping of the second subset of the M subcarriers to the L transmit antennas may be based on the received CSI.

In some implementations, the method may further include mapping a third subset of the M subcarriers to a number (J) of the transmit antennas based on a number ($N_{SS3}$) of the spatial streams modulated on the third subset of the M subcarriers, where $N_{SS3} \leq J < N_{TX}$; and transmitting a third portion of the PPDU to a receiving device via the J transmit antennas based on the mapping of the third subset of the M subcarriers.

Another innovative aspect of the subject matter described in this disclosure can be implemented in a wireless communication device. In some implementations, the wireless communication device may include a number ($N_{TX}$) of transmit antennas, at least one memory, and at least one processor communicatively coupled with the at least one memory and configured to cause the wireless communication device to perform operations including parsing a PPDU into a number ($N_{SS}$) of spatial streams, where $N_{SS} \geq 1$; modulating the $N_{SS}$ spatial streams on a number (M) of subcarriers spanning a bandwidth associated with a wireless channel; mapping a first subset of the M subcarriers to a number (K) of the transmit antennas based on a number ($N_{SS1}$) of the spatial streams modulated on the first subset of the M subcarriers, where $N_{SS1} \leq K < N_{TX}$; mapping a second subset of the M subcarriers to a number (L) of the transmit antennas based on a number ($N_{SS2}$) of the spatial streams modulated on the second subset of the M subcarriers, where $N_{SS2} \leq L < N_{TX}$; transmitting a first portion of the PPDU to a receiving device via the K transmit antennas based on the mapping of the first subset of the M subcarriers; and transmitting a second portion of the PPDU to the receiving device via the L transmit antennas based on the mapping of the second subset of the M subcarriers.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
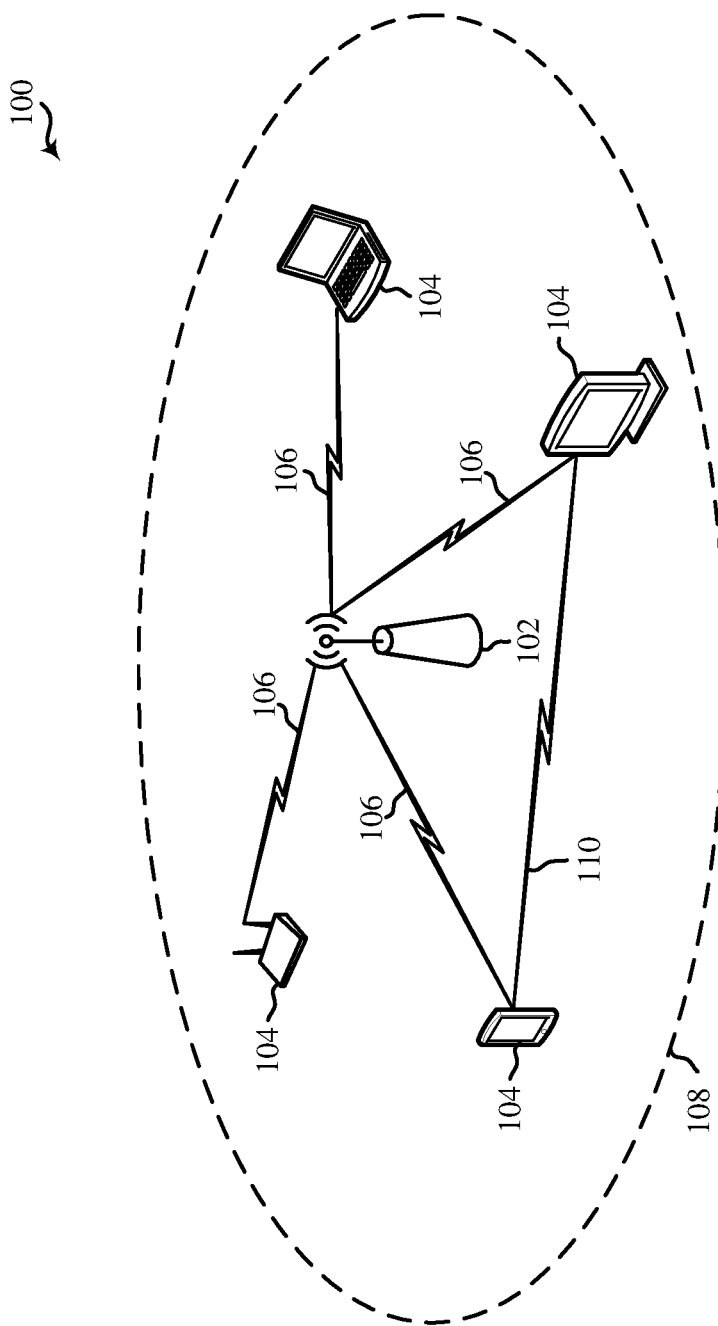
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

As described above, wireless communications in some frequency bands (such as the 6 GHz band) are subject to power spectral density (PSD) limits. When wireless signals are transmitted via multiple antennas (such as an antenna array), the energy radiated in any given direction must not exceed the PSD limit of the wireless channel. The directional gain of a wireless transmission is equal to the gain of each antenna plus any array gain that may result when the signals transmitted on different antennas are positively correlated in a particular direction (such as in beamformed transmissions or open loop transmissions that result in unintentional beamforming). Wireless signals are "correlated" if the same digital data is transmitted via two or more antennas in a given symbol period (even with different coding or phase shifts). Thus, correlated signals can exist at any frequency or time delay.

Existing wireless communication devices that have any number ($N_{TX}$) of transmit antennas (or radio chains) generally use all $N_{TX}$ transmit antennas for wireless transmissions, for example, to maximize spatial diversity. For open loop transmissions, the $N_{TX}$ antennas may be configured to transmit any number ($N_{SS}$) of spatial streams that is less than or equal to the number $N_{TX}$ of available transmit antennas. In other words, the $N_{SS}$ spatial streams must be transmitted using at least $N_{SS}$ transmit antennas. When the number $N_{SS}$ of spatial streams is less than the number $N_{TX}$ of available transmit antennas, the wireless communication device may use space-time block coding (STBC) or a precoding matrix to transmit multiple copies of the same data via multiple transmit antennas. As a result, existing wireless communication devices often incur a power penalty due to the array gain (A) associated with multi-antenna transmissions, where $A=10\times\log_{10}N_{TX}/N_{SS}$ dB. Aspects of the present disclosure recognize that the power penalty associated with open loop transmissions can be reduced by avoiding transmissions of correlated signals.

Various aspects relate generally to improving wireless communications in PSD-limited frequency bands, and more particularly, to reducing the power penalty associated with open loop transmissions in PSD-limited frequency bands. A wireless communication device, having a number ($N_{TX}$) of transmit antennas, may parse a physical layer (PHY) protocol data unit (PPDU) into a number ($N_{SS}$) of spatial streams and may modulate the $N_{SS}$ spatial streams on a number (M) of subcarriers (where $N_{SS} \geq 1$). In some aspects, the wireless communication device may map the M subcarriers to a number (N) of the transmit antennas, where $N_{SS} \leq N < N_{TX}$, and may transmit the PPDU to a receiving device based on the mapping of the M subcarriers to the N transmit antennas. More specifically, the wireless communication device may transmit the $N_{SS}$ spatial streams using only the N transmit antennas. In some other aspects, the wireless communication device may subdivide the M subcarriers into two or more groups and may map each subcarrier group to a respective subset of the $N_{TX}$ transmit antennas, where the number of transmit antennas mapped to each subcarrier group is greater than or equal to the number of spatial streams modulated on the subcarriers in the group but less than $N_{TX}$. In such aspects, the wireless communication device may transmit the PPDU based on the mappings of the subcarrier groups to the subsets of transmit antennas. More specifically, the wireless communication device may transmit the spatial streams associated with each subcarrier group using only the transmit antennas mapped to that subcarrier group.

Particular implementations of the subject matter described in this disclosure can be implemented to realize one or more of the following potential advantages. The present implementations can reduce the power penalty associated with open loop transmissions in PSD-limited frequency bands by reducing or eliminating transmissions of correlated signals. By using some, but not all, of the available transmit antennas to transmit any number of spatial streams, aspects of the present disclosure may reduce the number of correlated signals associated with an open loop transmission (compared to existing open loop transmission techniques). For example, by mapping a PPDU to a number of transmit antennas equal to the number of spatial streams associated with the PPDU ($N=N_{SS}$), a wireless communication device can transmit N uncorrelated signals via the N transmit antennas, respectively (where $N<N_{TX}$). Additionally, or alternatively, by mapping different groups of subcarriers (modulated with different portions of a PPDU) to different subsets of transmit antennas, aspects of the present disclosure may decorrelate the signals transmitted by each antenna (and may thus utilize a greater number of the available transmit antennas for open loop transmissions compared to implementations where the PPDU, as a whole, is mapped to $N_{SS} \leq N < N_{TX}$ antennas). For example, by subdividing the M subcarriers into $N_{TX}$ subcarrier groups, a wireless communication device can transmit $N_{TX}$ uncorrelated signals via the $N_{TX}$ antennas, respectively. Such techniques for reducing the power penalty associated with open loop transmissions can be used to increase the range of wireless communications and improve packet detection and channel estimation capabilities of wireless communication devices in PSD-limited frequency bands.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
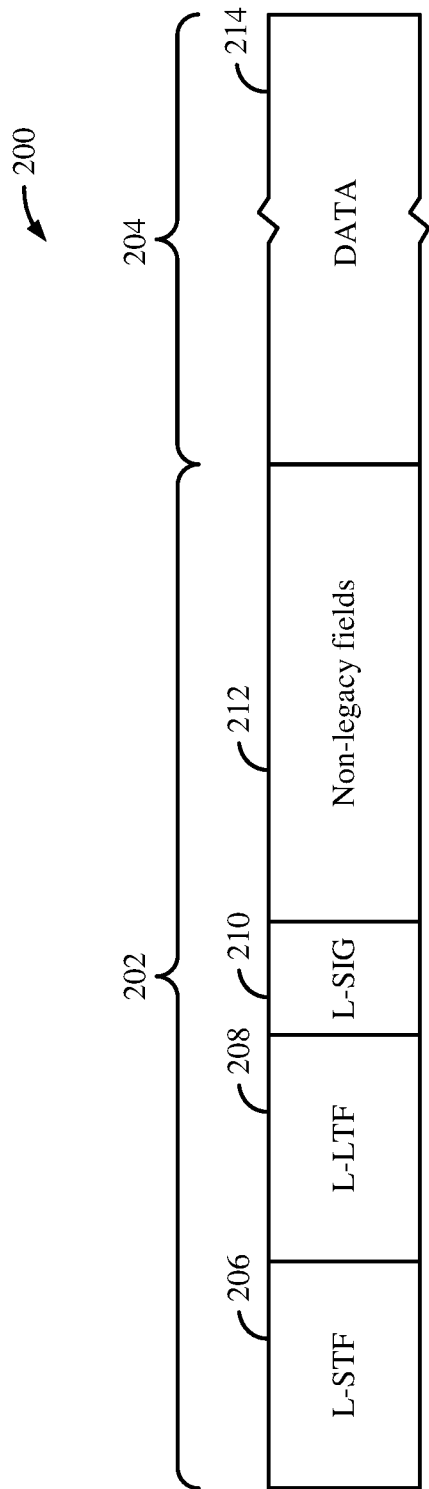
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
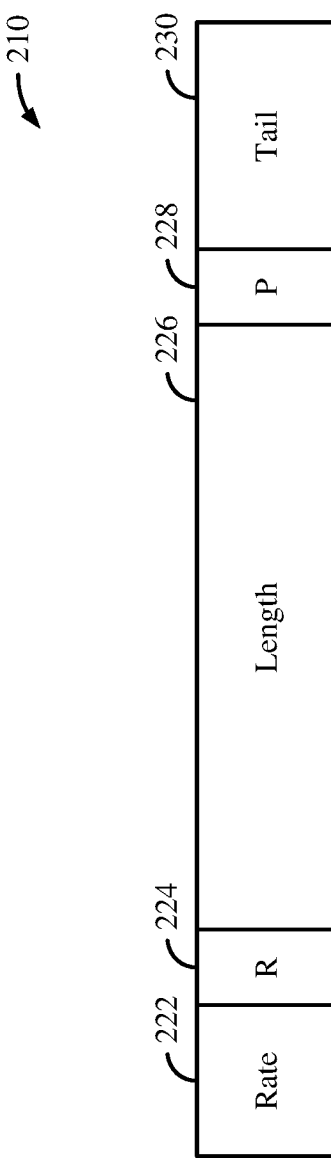
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (µs) or other time units.

Figure 3:
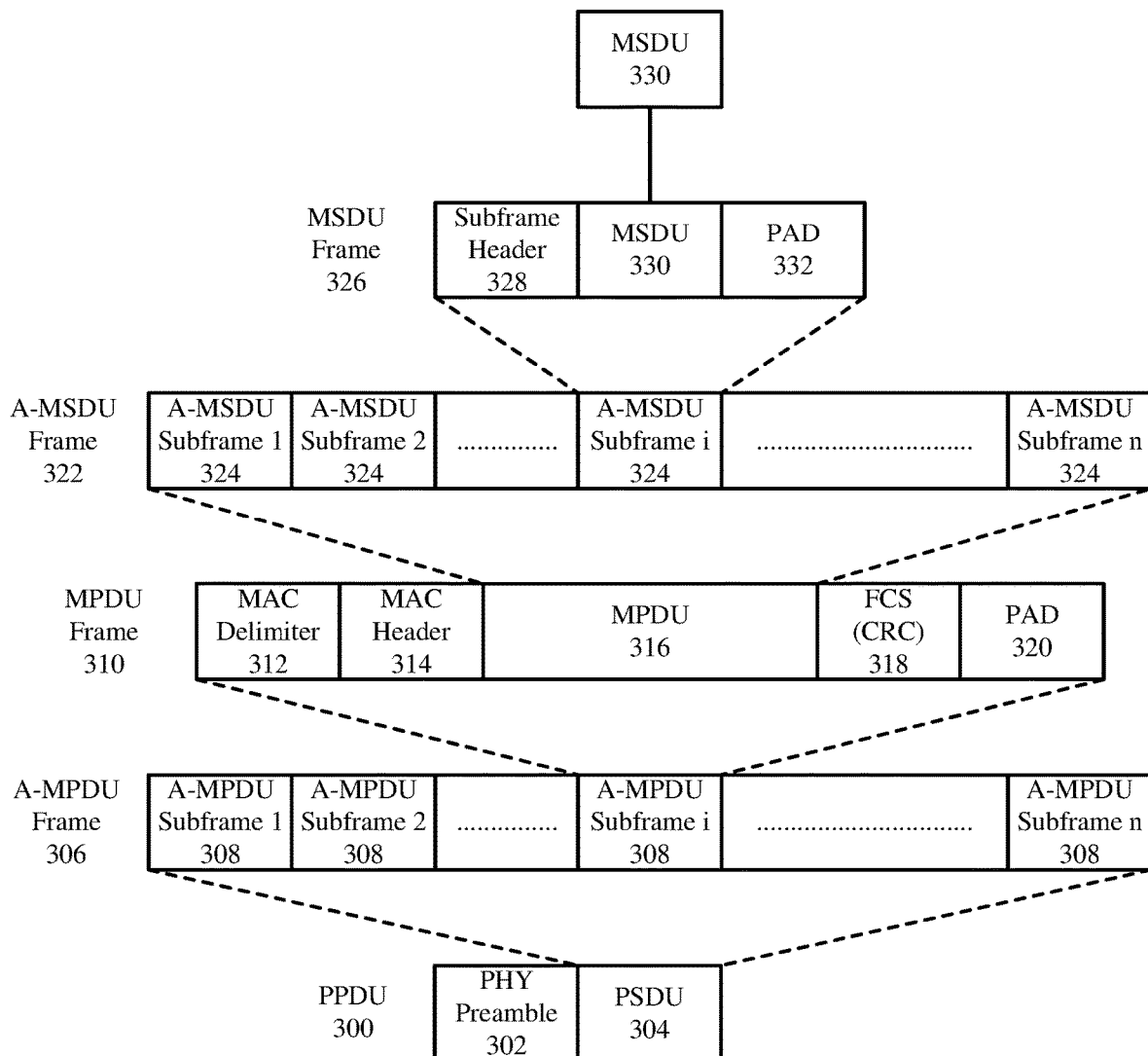
FIG. 3 shows an example physical layer convergence protocol (PLCP) protocol data unit (PPDU) usable for communications between an AP and one or more STAs.

FIG. 3 shows an example PPDU 300 usable for communications between an AP 102 and one or more STAs 104. As described above, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimeter 312 and a MAC header 314 prior to the accompanying MPDU 316, which comprises the data portion ("payload" or "frame body") of the MPDU frame 310. Each MPDU frame 310 may also include a frame check sequence (FCS) field 318 for error detection (for example, the FCS field may include a cyclic redundancy check (CRC)) and padding bits 320. The MPDU 316 may carry one or more MAC service data units (MSDUs) 326. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Figure 4:
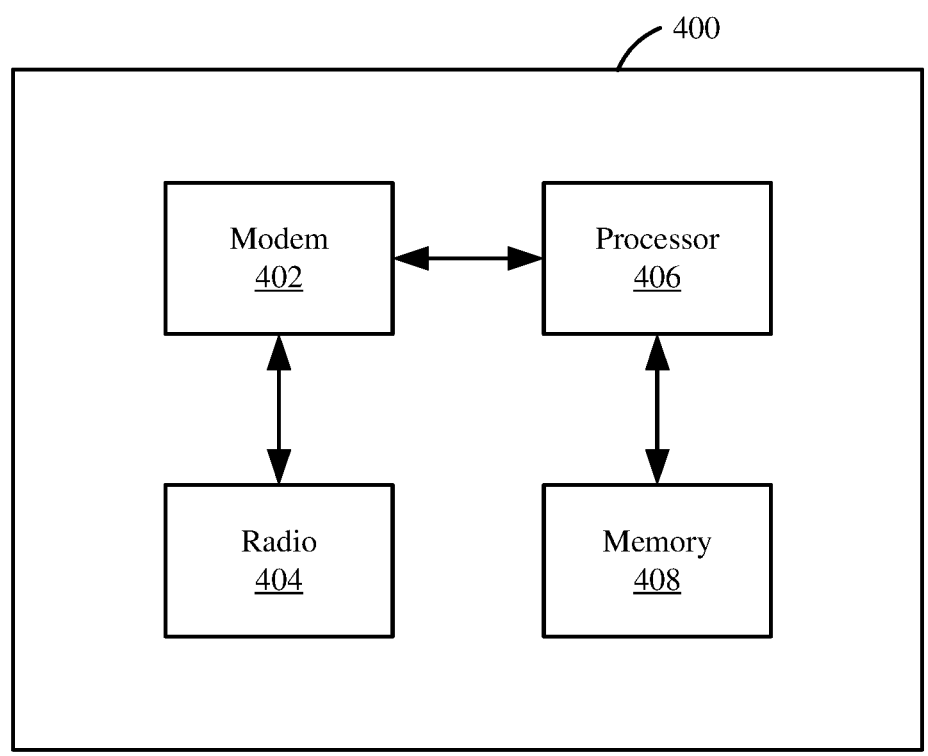
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for TX windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
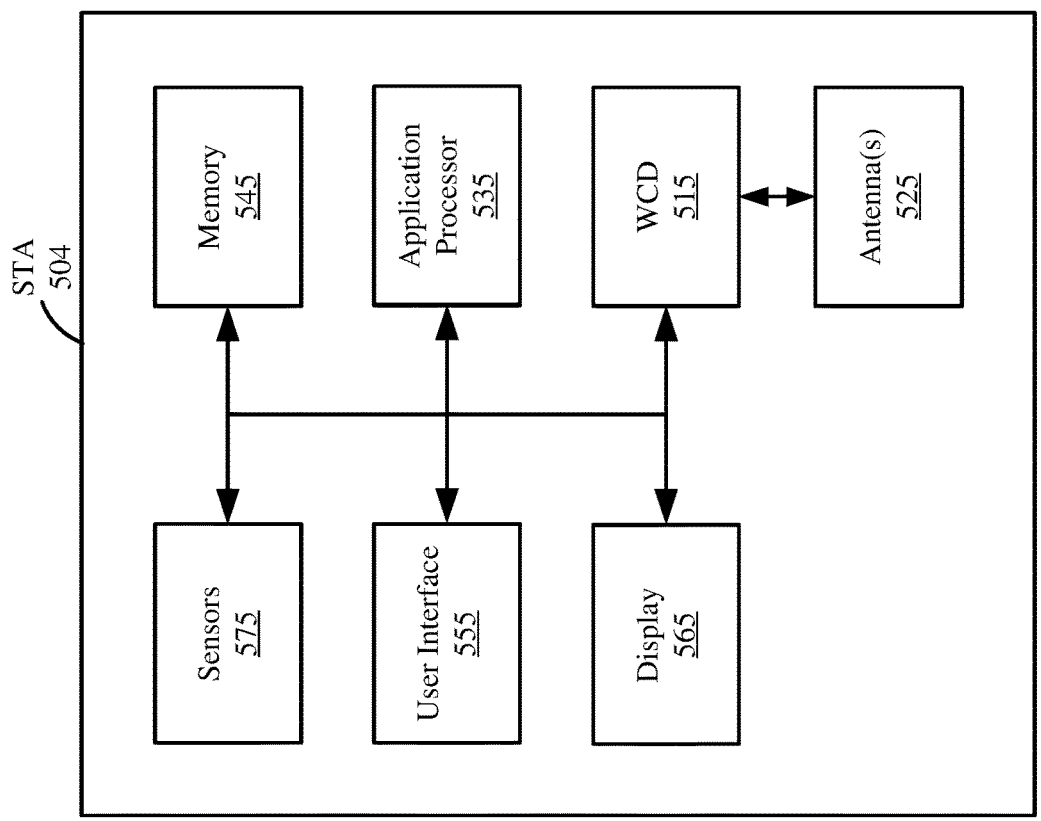
FIG. 5B shows a block diagram of an example STA.
Figure 5A:
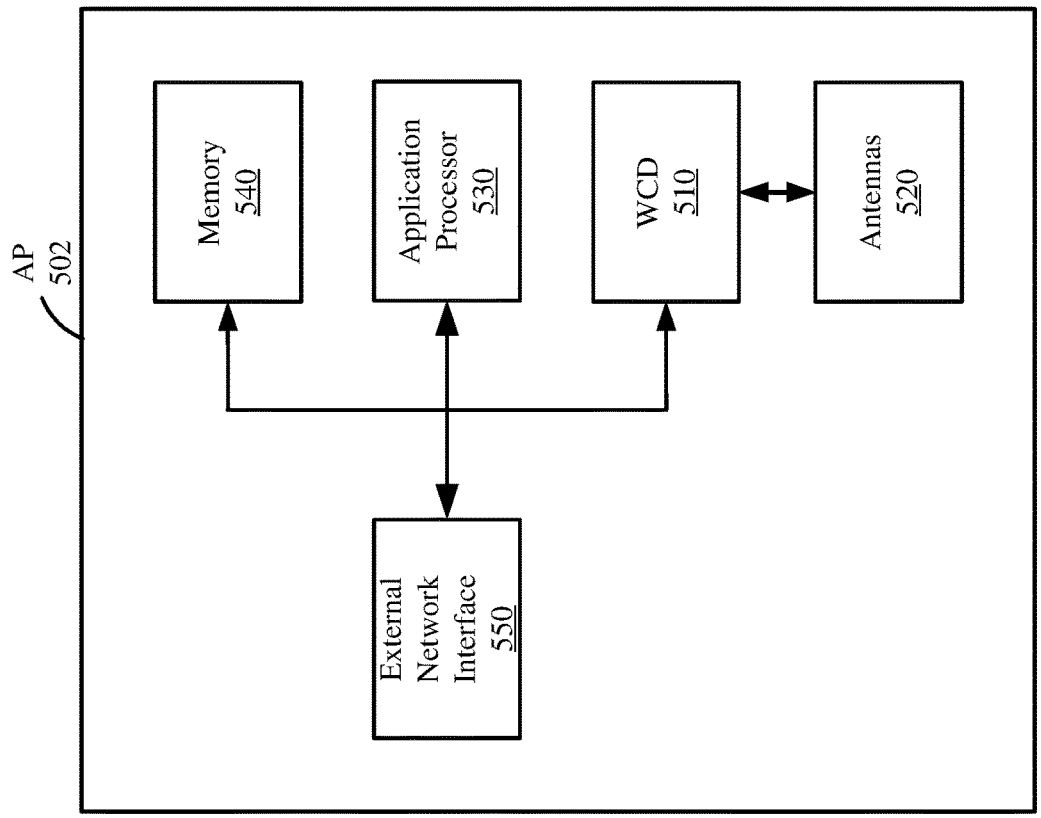
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

As described above, wireless communications in some frequency bands (such as the 6 GHz band) are subject to PSD limits. When wireless signals are transmitted via multiple antennas (such as an antenna array), the energy radiated in any given direction must not exceed the PSD limit of the wireless channel. The directional gain of a wireless transmission is equal to the gain of each antenna plus any array gain that may result when the signals transmitted on different antennas are positively correlated in a particular direction (such as in beamformed transmissions or open loop transmissions that result in unintentional beamforming). Wireless signals are "correlated" if the same digital data is transmitted via two or more antennas in a given symbol period (even with different coding or phase shifts). Thus, correlated signals can exist at any frequency or time delay. Aspects of the present disclosure recognize that the power penalty associated with open loop transmissions can be reduced by avoiding transmissions of correlated signals.

Various aspects relate generally to improving wireless communications in PSD-limited frequency bands, and more particularly, to reducing the power penalty associated with open loop transmissions in PSD-limited frequency bands. A wireless communication device, having a number ($N_{TX}$) of transmit antennas, may parse a PPDU into a number ($N_{SS}$) of spatial streams and may modulate the $N_{SS}$ spatial streams on a number (M) of subcarriers (where $N_{SS} \geq 1$). In some aspects, the wireless communication device may map the M subcarriers to a number (N) of the transmit antennas, where $N_{SS} \leq N < N_{TX}$, and may transmit the PPDU to a receiving device based on the mapping of the M subcarriers to the N transmit antennas. More specifically, the wireless communication device may transmit the $N_{SS}$ spatial streams using only the N transmit antennas. In some other aspects, the wireless communication device may subdivide the M subcarriers into two or more groups and may map each subcarrier group to a respective subset of the $N_{TX}$ transmit antennas, where the number of transmit antennas mapped to each subcarrier group is greater than or equal to the number of spatial streams modulated on the subcarriers in the group but less than $N_{TX}$. In such aspects, the wireless communication device may transmit the PPDU based on the mappings of the subcarrier groups to the subsets of transmit antennas. More specifically, the wireless communication device may transmit the spatial streams associated with each subcarrier group using only the transmit antennas mapped to that subcarrier group.

Particular implementations of the subject matter described in this disclosure can be implemented to realize one or more of the following potential advantages. The present implementations can reduce the power penalty associated with open loop transmissions in PSD-limited frequency bands by reducing or eliminating transmissions of correlated signals. By using some, but not all, of the available transmit antennas to transmit any number of spatial streams, aspects of the present disclosure may reduce the number of correlated signals associated with an open loop transmission (compared to existing open loop transmission techniques). For example, by mapping a PPDU to a number of transmit antennas equal to the number of spatial streams associated with the PPDU ($N=N_{SS}$), a wireless communication device can transmit N uncorrelated signals via the N transmit antennas, respectively (where $N<N_{TX}$). Additionally, or alternatively, by mapping different groups of subcarriers (modulated with different portions of a PPDU) to different subsets of transmit antennas, aspects of the present disclosure may decorrelate the signals transmitted by each antenna (and may thus utilize a greater number of the available transmit antennas for open loop transmissions compared to implementations where the PPDU, as a whole, is mapped to $N_{SS} \leq N < N_{TX}$ antennas). For example, by subdividing the M subcarriers into $N_{TX}$ subcarrier groups, a wireless communication device can transmit $N_{TX}$ uncorrelated signals via the $N_{TX}$ antennas, respectively. Such techniques for reducing the power penalty associated with open loop transmissions can be used to increase the range of wireless communications and improve packet detection and channel estimation capabilities of wireless communication devices in PSD-limited frequency bands.

Figure 6:
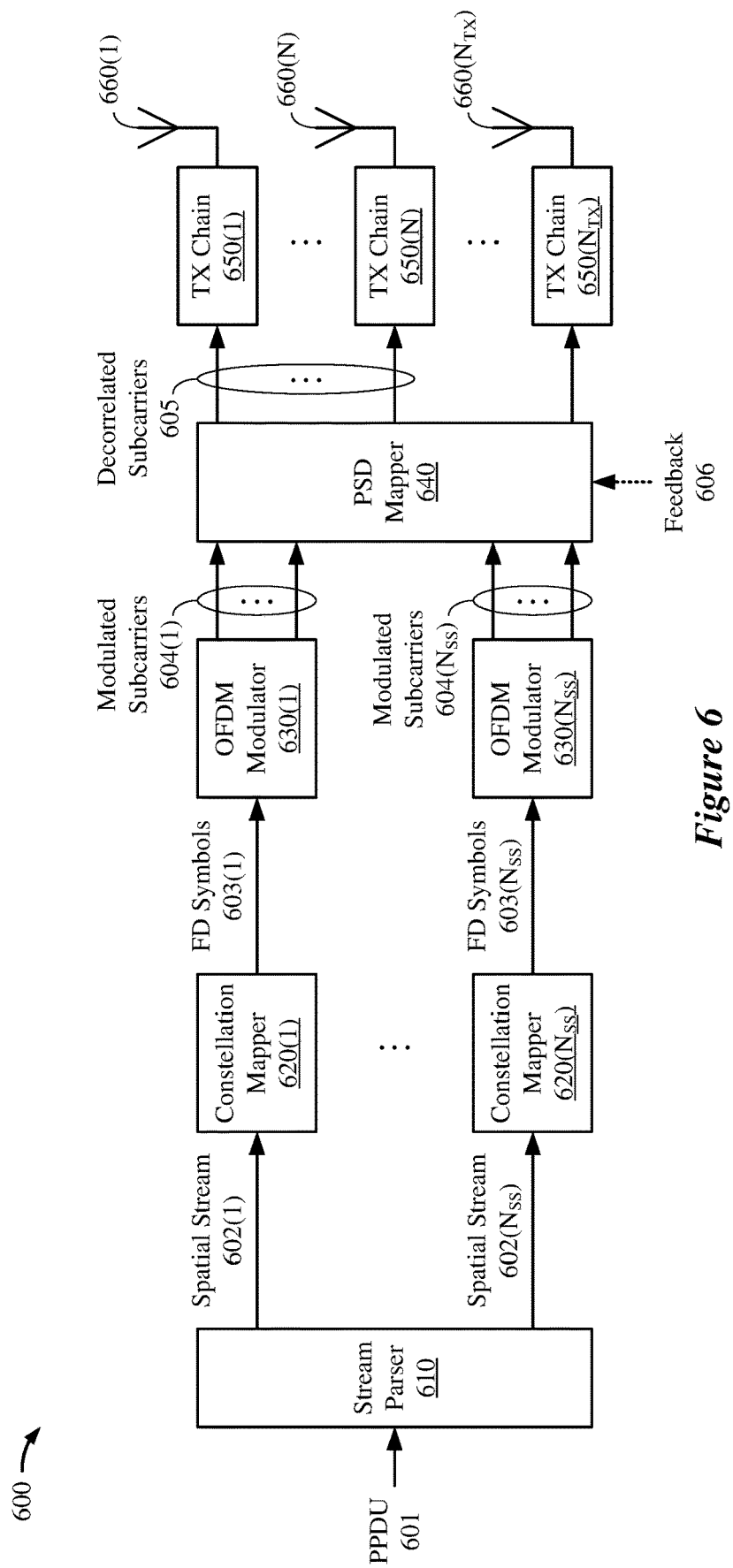
FIG. 6 shows a block diagram of an example transmitter for a wireless communication device, according to some implementations.

FIG. 6 shows a block diagram of an example transmitter 600 for a wireless communication device, according to some implementations. In some aspects, the wireless communication device may be one example of the wireless communication device 400 of FIG. 4. The transmitter 600 includes a stream parser 610, constellation mappers 620(1)-620($N_{SS}$), OFDM modulators 630(1)-630($N_{SS}$), a PSD mapper 640, and transmit (TX) chains $650(1)$-$650(N_{TX})$ coupled to a number ($N_{TX}$) of TX antennas $660(1)$-$660(N_{TX})$, respectively. In some aspects, the transmitter 600 may be configured to process a PPDU 601 for transmission via one or more of the TX antennas $660(1)$-$660(N_{TX})$.

The stream parser 610 parses the PPDU 601 into a number ($N_{SS}$) of spatial streams $602(1)$-$602(N_{SS})$. In some aspects, the number of spatial streams may be equal to one ($N_{SS}=1$). In some other aspects, the number of spatial streams may be greater than one ($N_{SS}>1$). In such aspects, each of the spatial streams $602(1)$-$602(N_{SS})$ may include a different (non-overlapping) portion of the data in the payload of the PPDU 601. The constellation mappers $620(1)$-$620(N_{SS})$ map the spatial streams $602(1)$-$602(N_{SS})$ to frequency-domain (FD) symbols $603(1)$-$603(N_{SS})$, respectively, in accordance with a modulation scheme. Example suitable modulation schemes include binary phase-shift keying (BPSK), quadrature phase-shift keying (QPSK), and quadrature amplitude modulation (QAM), among other examples. The OFDM modulators $630(1)$-$630(N_{SS})$ modulate the FD symbols $603(1)$-$603(N_{SS})$ onto orthogonal subcarriers $604(1)$-$604(N_{SS})$, respectively. More specifically, each of the OFDM modulators $630(1)$-$630(N_{SS})$ may modulate a respective set of FD symbols $603(1)$-$603(N_{SS})$ on a number (M) of subcarriers spanning a bandwidth associated with a wireless channel.

In some aspects, the PSD mapper 640 may be configured to map the modulated subcarriers $604(1)$-$604(N_{SS})$ to one or more of the TX antennas $660(1)$-$660(N_{TX})$ based on a PSD limit associated with the wireless channel. In some implementations, the mapping may reduce the number of correlated signals transmitted by the transmitter 600 when operating in a PSD-limited frequency band (such as a 6 GHz LPI channel). Aspects of the present disclosure recognize that the number of correlated signals can be reduced by eliminating or avoiding duplicate transmissions of the same data via multiple TX antennas. Aspects of the present disclosure also recognize that because different spatial streams carry different (uncorrelated) data, the spatial streams $602(1)$-$602(N_{SS})$ can be transmitted via $N_{SS}$ TX antenna without creating array gains (as defined by PSD limitations). Thus, in some aspects, the PSD mapper 640 may map the modulated subcarriers $604(1)$-$604(N_{SS})$ to a number (N) of TX antennas $660(1)$-$660(N)$ that is at least equal to the number of spatial streams, but less than the total number of available TX antennas ($N_{SS} \leq N < N_{TX}$).

In some implementations, the PSD mapper 640 may map each set of modulated subcarriers $604(1)$-$604(N_{SS})$ to a respective TX antenna ($N=N_{SS}$) so that no duplicate data is transmitted from the TX antennas $660(1)$-$660(N)$. For example, the PSD mapper 640 may provide the modulated subcarriers $604(1)$-$604(N_{SS})$, as decorrelated subcarriers 605, directly to the TX chains $650(1)$-$650(N)$ coupled to the TX antennas $660(1)$-$660(N)$. In such implementations, the PSD mapper 640 may optimize the transmit power of open loop transmissions (such as by avoiding any transmissions of correlated signals) but may sacrifice some spatial diversity (due to unused TX antennas).

In some other implementations, the PSD mapper 640 may map one or more of the sets of modulated subcarriers $604(1)$-$604(N_{SS})$ to multiple TX antennas ($N>N_{SS}$) so that some duplicate data is transmitted from the TX antennas $660(1)$-$660(N)$. For example, the PSD mapper 640 may apply STBC or a precoding matrix to one or more sets of the modulated subcarriers $604(1)$-$604(N_{SS})$ to produce the decorrelated subcarriers 605. In such implementations, the PSD mapper 640 may achieve greater spatial diversity by sacrificing some gains in transmit power for open loop transmissions (compared to implementations where $N=N_{SS}$).

In the example of FIG. 6, the modulated subcarriers $604(1)$-$604(N_{SS})$ are depicted as being mapped to the first N TX antennas of an antenna array (such as TX antennas indexed 1-N). However, in actual implementations, the PSD mapper 640 may map the modulated subcarriers $604(1)$-$604(N_{SS})$ to any combination or subset of N TX antennas in the antenna array. In some aspects, the PSD mapper 640 may randomly select the TX antennas to which the modulated subcarriers $604(1)$-$604(N_{SS})$ are mapped. In some other aspects, the PSD mapper 640 may determine the TX antennas to be mapped to the modulated subcarriers $604(1)$-$604(N_{SS})$ based on a lookup table (or some predetermined procedure).

In some implementations, the lookup table may indicate which of the TX antennas $660(1)$-$660(N_{TX})$ are to be used to transmit any given number of spatial streams. In such implementations, the PSD mapper 640 may select the TX antennas based on the number $N_{SS}$ of spatial streams associated with the PPDU 601. In some other implementations, the lookup table may store historical data associated with previous transmissions using various combinations of the TX antennas $660(1)$-$660(N_{TX})$. Example historical data may include, among other examples, a signal-to-noise ratio (SNR) or signal-to-interference-plus-noise ratio (SINR) associated with any subset or combination of the TX antennas $660(1)$-$660(N_{TX})$. In such implementations, the PSD mapper 640 may select the TX antennas expected to optimize processing SNR (or SINR) or spatial diversity based on the historical data stored by the lookup table.

In some other aspects, the PSD mapper 640 may receive feedback 606 from a receiving device (such as any device that receives the open loop transmissions from the transmitter 600) and may select the TX antennas $660(1)$-$660(N)$ to be mapped to the modulated subcarriers $604(1)$-$604(N_{SS})$ based on the received feedback 606. In some aspects, the feedback 606 may include channel state information (CSI) associated with the wireless channel. In some implementations, the selected the TX antennas $660(1)$-$660(N)$ may result in the highest processing SNR (or SINR) indicated by the received CSI. In some other implementations, the selected the TX antennas $660(1)$-$660(N)$ may be associated with the highest channel gains indicated by the received CSI.

In some other implementations, one of the selected TX antennas $660(1)$-$660(N)$ may be associated with the highest channel gain indicated by the received CSI and the remaining N−1 TX antennas may be selected based on their degree of correlation with others of the TX antennas $660(1)$-$660(N)$. For example, if N=3, the PSD mapper 640 may select a first TX antenna having the highest channel gain, among the TX antennas $660(1)$-$660(N_{TX})$, indicated by the received CSI; may select a second TX antenna having the lowest correlation, among the TX antennas $660(1)$-$660(N_{TX})$, with the first TX antenna; and may select a third TX antenna having the lowest correlation, among the TX antennas $660(1)$-$660(N_{TX})$, with the first and second TX antennas.

In some other implementations, one of the selected TX antennas $660(1)$-$660(N)$ may be associated with the highest channel gain indicated by the received CSI and the remaining N−1 TX antennas may be selected based on their associated channel gains in directions orthogonal to others of the TX antennas $660(1)$-$660(N)$. For example, if N=3, the PSD mapper 640 may select a first TX antenna having the highest channel gain, among the TX antennas $660(1)$-$660(N_{TX})$, indicated by the received CSI; may select a second TX antenna having the highest channel gain, indicated by the CSI, in a direction orthogonal to the first TX antenna; and may select a third TX antenna having the highest channel gain, indicated by the CSI, in a direction orthogonal to the first and second TX antennas.

In some other aspects, the feedback 606 may identify the TX antennas 660(1)-660(N) to be used to transmit the PPDU 601. In other words, the receiving device may indicate or suggest how the modulated subcarriers 604(1)-604($N_{SS}$) should be mapped to the TX antennas 660(1)-660(N). In some implementations, the receiving device may select the TX antennas 660(1)-660(N) based on CSI associated with the wireless channel (such as by using any of the antenna selection criteria described above). For example, the receiving device may perform an antenna selection operation (that would otherwise be performed by the PSD mapper 640) based on the CSI acquired from previous open loop transmissions by the transmitter 600.

The TX chains 650(1)-650($N_{TX}$) are configured to process modulated subcarriers for transmission via the TX antennas 660(1)-660($N_{TX}$), respectively. More specifically, each of the TX chains 650(1)-650(N) may process a respective subset of the decorrelated subcarriers 605 based on the mapping performed by the PSD mapper 640. Example processing may include, among other examples, converting the frequency-domain subcarriers to time-domain samples (such as via an inverse fast Fourier transform (IFFT)), adding a cyclic prefix to the timed-domain samples, converting the time-domain samples to a time-varying signal (such as via a digital-to-analog converter (DAC)), up-converting the time-varying signal to a radio frequency (RF) signal (such as by mixing the time-varying signal with a signal or waveform oscillating at a carrier frequency), and amplifying the power of the RF signal (such as via a power amplifier).

In some aspects, the transmitter 600 may include additional elements or features not shown in FIG. 6. For example, the transmitter 600 may further include a forward error correction (FEC) encoder that encodes the PPDU 601 to enable error detection (and correction) at the receiving device. More specifically, FEC may be performed prior to parsing the PPDU 601 into spatial streams 602(1)-602($N_{SS}$). Example suitable FEC encoders include low-density parity-check (LDPC) encoders and binary convolutional code (BCC) encoders, among other examples. When the PPDU 601 is BCC-encoded, the transmitter 600 may further include $N_{SS}$ interleavers that interleave the bits of the spatial streams 602(1)-602($N_{SS}$), respectively, to prevent long sequences of adjacent noisy bits from entering the BCC decoder (at the receiving device).

Figure 7:
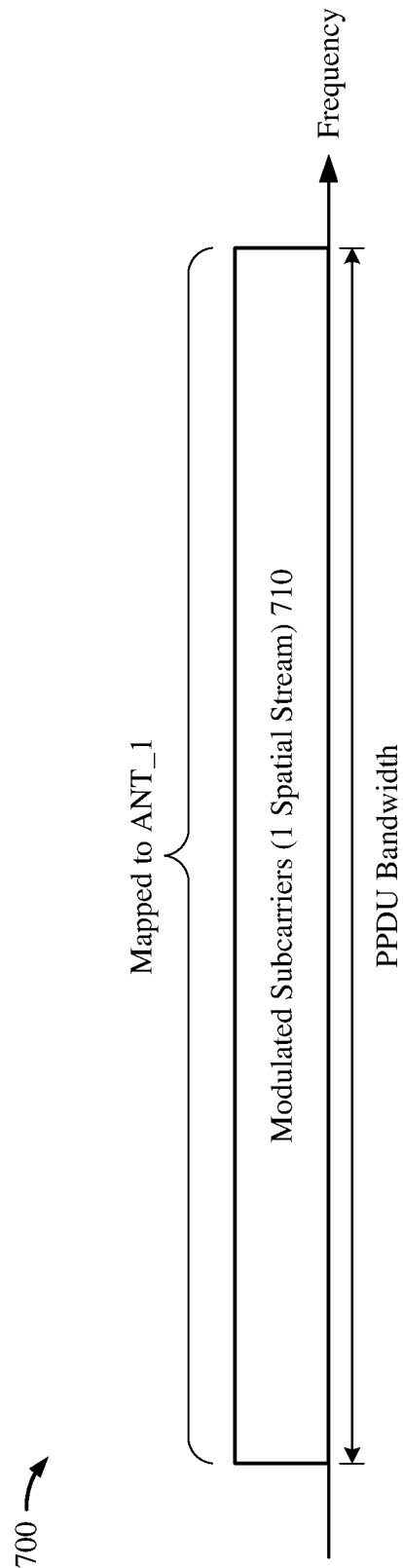
FIG. 7 shows a frequency diagram depicting an example mapping of a PPDU to a subset of transmit (TX) antennas, according to some implementations.

FIG. 7 shows a frequency diagram depicting an example mapping of a PPDU 700 to a subset of TX antennas, according to some implementations. In some aspects, the mapping may avoid correlated signals in open loop transmissions. In some implementations, the mapping may be performed by the PSD mapper 640 of FIG. 6. In the example of FIG. 7, the PPDU 700 is shown to include a single spatial stream ($N_{SS}$=1) modulated on a set of subcarriers 710 spanning a bandwidth associated with a wireless channel (also referred to as the "PPDU bandwidth"). As described with reference to FIG. 6, correlated signals can be avoided by mapping the modulated subcarriers 710 to a number (N) of TX antennas equal to the number of spatial streams (N=$N_{SS}$). Because the PPDU 700 includes only a single spatial stream, the open loop transmit power of the PPDU 700 may be optimized by mapping the modulated subcarriers 710 to a single TX antenna (ANT_1). With reference to FIG. 6, the TX antenna ANT_1 may be any one of the TX antennas 660(1)-660($N_{TX}$).

The mapping shown in FIG. 7 reduces the power penalty associated with open loop transmissions in PSD-limited frequency bands. As a result, the PPDU 700 can be transmitted with a higher transmit power compared to existing open loop transmission techniques. For example, the PPDU 700 can be transmitted in a 6 GHz (LPI) frequency band with a total conducted power of up to 30 dBm using 1 TX antenna (compared to 24 dBm using 4 TX antennas), which represents a 6 dB increase in transmit power. However, to achieve such gains in transmit power, the power amplifier coupled to the TX antenna ANT_1 may need to support higher output power. Further, the mapping shown in FIG. 7 cannot benefit from any spatial diversity associated with having multiple TX antennas. Aspects of the present disclosure recognize that, because each of the modulated subcarriers 710 carries different (uncorrelated) data, a wireless communication device may achieve spatial diversity, without incurring any additional power penalty, in open loop transmissions by mapping different subsets or groups of the modulated subcarriers 710 to different TX antennas.

Figure 8:
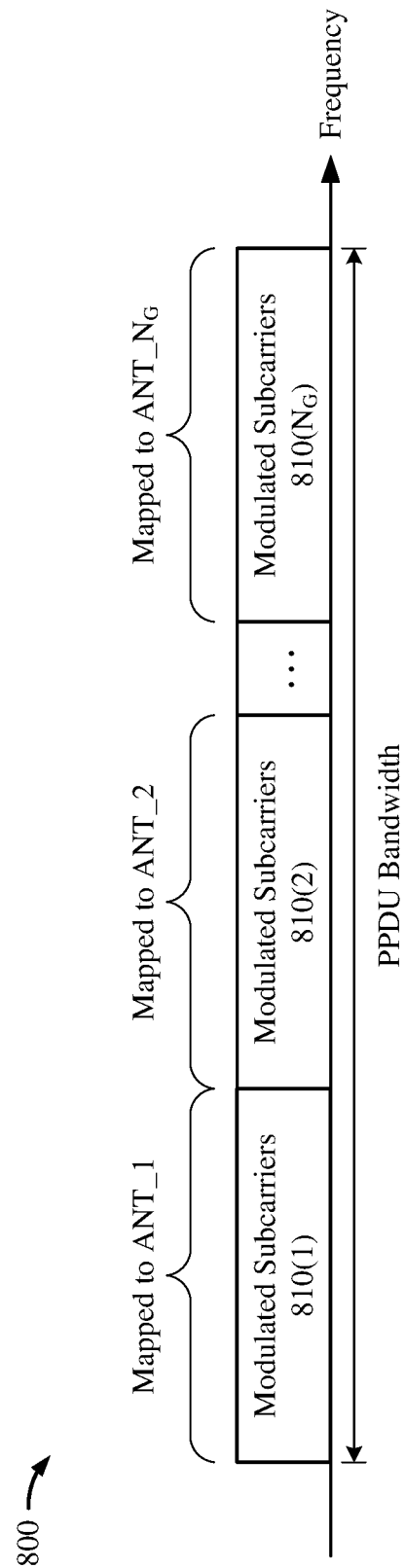
FIG. 8 shows another frequency diagram depicting an example mapping of a PPDU to a subset of TX antennas, according to some implementations.

FIG. 8 shows another frequency diagram depicting an example mapping of a PPDU 800 to a subset of transmit antennas, according to some implementations. In some aspects, the mapping may avoid correlated signals in open loop transmissions. In some implementations, the PPDU 800 may be one example of the PPDU 700 of FIG. 7. More specifically, the PPDU 800 may include a single spatial stream that is modulated on a set of subcarriers spanning a PPDU bandwidth. In the example of FIG. 8, the set of subcarriers is subdivided into a number ($N_G$) of groups 810(1)-810($N_G$) so that each group includes one or more of the modulated subcarriers. In some aspects, each of the subcarrier groups 810(1)-810($N_G$) may coincide with a respective (non-overlapping) portion of the PPDU bandwidth. In other words, subcarriers belonging to group 810(1) are exclusive to group 810(1), subcarriers belonging to the group 810(2) are exclusive to the group 810(2), and subcarriers belonging to group 810($N_G$) are exclusive to group 810($N_G$). For example, each of the subcarrier groups 810(1)-810($N_G$) may be associated with a different resource unit (RU) (such as defined by existing versions of the IEEE 802.11 standard) or sub-band of the PPDU bandwidth. In some implementations, each of the subcarrier groups 810(1)-810($N_G$) may include the same number of modulated subcarriers. In some other implementations, some of the subcarrier groups 810(1)-810($N_G$) may include fewer or more modulated subcarriers than others.

In some implementations, each group of subcarriers 810(1)-810($N_G$) may be mapped to a respective TX antenna (ANT_1-ANT_$N_G$). Because each group of modulated subcarriers 810(1)-810($N_G$) carries different (uncorrelated) data, the mapping of the subcarrier groups 810(1)-810($N_G$) to the TX antennas ANT_1-ANT_$N_G$, respectively, does not create array gains in open loop transmissions (as defined by PSD limitations). Compared to the example mapping of FIG. 7, the mapping shown in FIG. 8 can utilize a greater number of TX antennas to transmit the same number of spatial streams (without additional power penalty) and can thus achieve greater spatial diversity in open loop transmissions. For example, when the number of subcarrier groups is equal to the total number of available TX antennas ($N_G$=$N_{TX}$), the PPDU 800 can be transmitted using all of the available TX antennas. In some aspects, the example mapping of FIG. 8 can be extended to multiple spatial streams. In such aspects, each group of subcarriers 810(1)-810($N_G$)

may be mapped to a respective number (K) of TX antennas based on the number ($N_{SS}$) of spatial streams modulated on the subcarriers in that group and the total number ($N_{TX}$) of available TX antennas, where $N_{SS} \leq K < N_{TX}$.

Aspects of the present disclosure recognize that the tone plans associated with existing versions of the IEEE 802.11 standard require guard subcarriers (that are nulled) to be inserted at the edges or boundaries of various sub-bands. A receiving device may fill in the guard subcarriers at some sub-band boundaries to simulate a continuous channel (referred to as "channel smoothing"). However, mapping each group of subcarriers 810(1)-810($N_G$) to a different TX antenna causes each group of subcarriers 810(1)-810($N_G$) to be transmitted over a respective wireless channel. For example, the first group of modulated subcarriers 810(1) and the second group of modulated subcarriers 810(2) may not be transmitted over the same continuous channel. As a result, channel smoothing at the boundary between the first group of subcarriers 810(1) and the second group of subcarriers 810(2) may cause errors in the received signals. In some aspects, the sizes of the subcarrier groups 810(1)-810($N_G$) may be configured so that channel smoothing is avoided at the group boundaries. Aspects of the present disclosure recognize that existing wireless communication devices do not perform channel smoothing at 80 MHz sub-band boundaries. In some implementations, each group of modulated subcarriers 810(1)-810($N_G$) may coincide with a respective 80 MHz sub-band.

Figure 9:
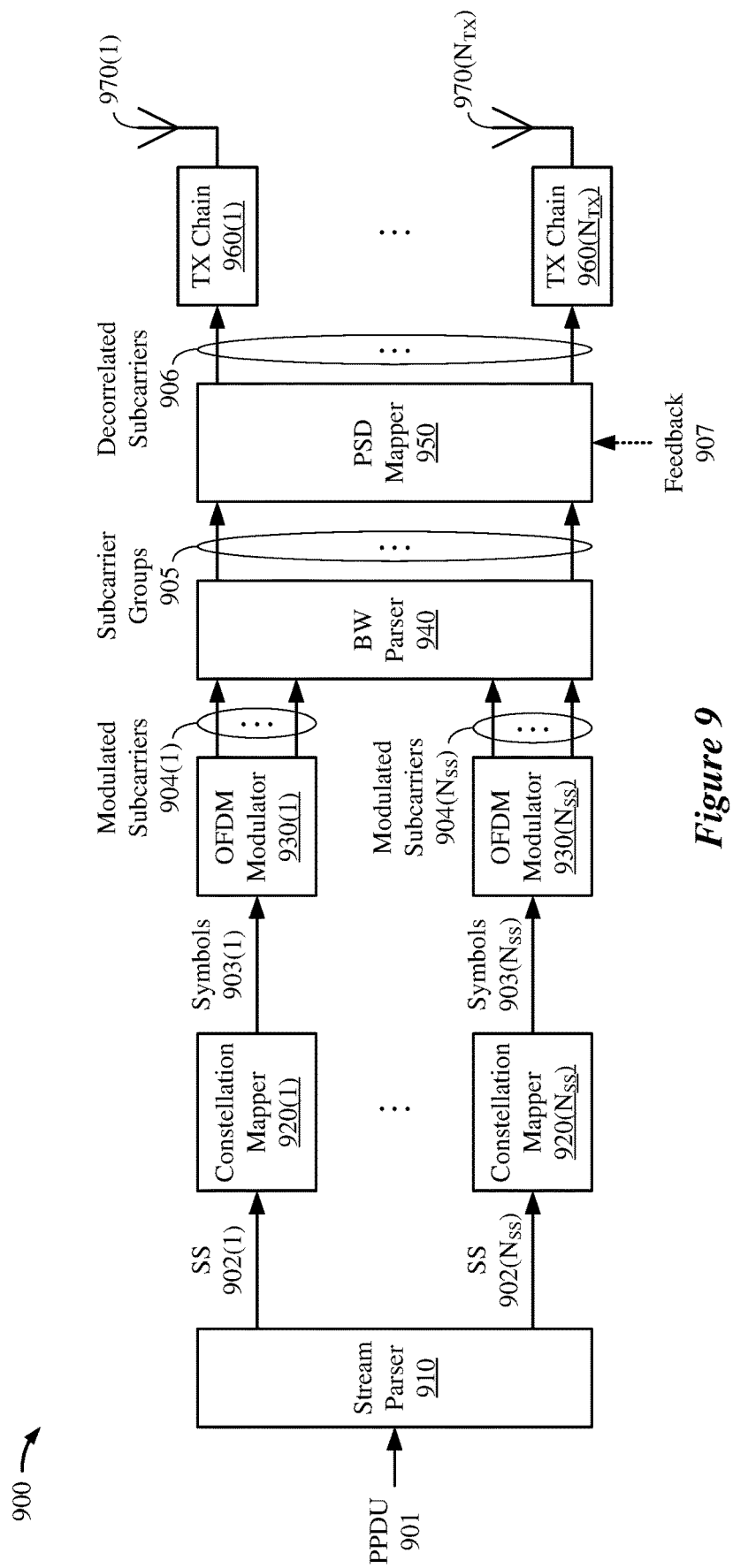
FIG. 9 shows another block diagram of an example transmitter for a wireless communication device, according to some implementations.

FIG. 9 shows another block diagram of an example transmitter 900 for a wireless communication device, according to some implementations. In some aspects, the wireless communication device may be one example of the wireless communication device 400 of FIG. 4. The transmitter 900 includes a stream parser 910, constellation mappers 920(1)-920($N_{SS}$), OFDM modulators 930(1)-930($N_{SS}$), a bandwidth (BW) parser 940, a PSD mapper 950, and TX chains 960(1)-960($N_{TX}$) coupled to a number ($N_{TX}$) of TX antennas 970(1)-970($N_{TX}$), respectively. In some aspects, the transmitter 900 may be configured to process a PPDU 901 for transmission via one or more of the TX antennas 970(1)-970($N_{TX}$).

The stream parser 910 parses the PPDU 901 into a number ($N_{SS}$) of spatial streams 902(1)-902($N_{SS}$). In some aspects, the number of spatial streams may be equal to one ($N_{SS}$=1). In some other aspects, the number of spatial streams may be greater than one ($N_{SS}$>1). In such aspects, each of the spatial streams 902(1)-902($N_{SS}$) may include a different (non-overlapping) portion of the data in the payload of the PPDU 901. The constellation mappers 920(1)-920($N_{SS}$) map the spatial streams 902(1)-902($N_{SS}$) to frequency-domain symbols 903(1)-903($N_{SS}$), respectively, in accordance with a modulation scheme. Example suitable modulation schemes include BPSK, QPSK, and QAM, among other examples. The OFDM modulators 930(1)-930($N_{SS}$) modulate the frequency-domain symbols 903(1)-903($N_{SS}$) onto orthogonal subcarriers 904(1)-904($N_{SS}$), respectively. More specifically, each of the OFDM modulators 930(1)-930($N_{SS}$) may modulate a respective set of the symbols 903(1)-903($N_{SS}$) on a number (M) of subcarriers spanning a bandwidth associated with a wireless channel.

In some aspects, the BW parser 940 may subdivide the M subcarriers into a number ($N_G$) of subcarrier groups 905 (such as described with reference to FIG. 8). In some implementations, the subcarriers in each of the subcarrier groups 905 may represent a respective (non-overlapping) portion of the PPDU bandwidth. In some implementations, each of the subcarrier groups 905 may be associated with a respective RU or multiple-RU (M-RU). In some other implementations, each of the subcarriers groups 905 may be associated with a respective sub-band of the PPDU bandwidth. In some implementations, the sub-bands may be configured to avoid channel smoothing between subcarrier group boundaries (such as described with reference to FIG. 8). In some implementations, each of the subcarrier groups 905 may include the same number of modulated subcarriers. For example, each of the subcarrier groups 905 may be associated with the same RU or sub-band size. In some other implementations, at least one of the subcarrier groups 905 may include a different number of subcarriers than any of the remaining subcarrier groups 905. For example, the subcarrier groups 905 may be associated with different RU or sub-band sizes.

In some aspects, the PSD mapper 950 may be configured to map each of the subcarrier groups 905 to one or more of the TX antennas 970(1)-970($N_{TX}$) based on a PSD limit associated with the wireless channel. For example, the mapping may reduce the number of correlated signals transmitted by the transmitter 900 when operating in a PSD-limited frequency band (such as the 6 GHz LPI channel). In some aspects, the PSD mapper 950 may map each of the subcarrier groups 905 to a respective number (K) of TX antennas that is at least equal to the number ($N_{SS}' \leq N_{SS}$) of spatial streams modulated on the subcarriers in that group, but less than the total number of available TX antennas ($N_{SS}' \leq K < N_{TX}$). In some aspects, the PSD mapper 950 may randomly select the TX antennas to which the subcarrier groups 905 are mapped. In some other aspects, the PSD mapper 950 may determine the TX antennas to be mapped to the subcarrier groups 905 based on a lookup table (or some predetermined procedure). Still further, in some aspects, the PSD mapper 950 may receive feedback 907 from the receiving device and may select the TX antennas to be mapped to the subcarrier groups 905 based on the received feedback 907. In some implementations, the feedback 907 may include CSI associated with one or more of the subcarrier groups 905. In some other implementations, the feedback 907 may include an indication of the TX antennas to be mapped to the subcarrier groups 905.

In the example of FIG. 9, the subcarrier groups 905 are shown to be mapped to all of the available TX antennas 970(1)-970($N_{TX}$). However, in actual implementations, the PSD mapper 950 may map the subcarrier groups 905 to any subset of the TX antennas 970(1)-970($N_{TX}$). The PSD mapper 950 provides a set of decorrelated subcarriers 906 to the TX chains 960(1)-960($N_{TX}$), coupled to the TX antennas 970(1)-970($N_{TX}$), based on the mapping. As described with reference to FIG. 6, the decorrelated subcarriers 906 may include one or more copies of each set of the modulated subcarriers 904(1)-904($N_{SS}$) (depending on whether STBC, or a precoding matrix, is used in the mapping of any of the subcarrier groups 905 to a respective subset of TX antennas). The total number (N) of TX antennas used to transmit the PPDU 901 may depend on the total number ($N_G$) of subcarrier groups 905 and the TX antennas to which each subcarrier group is mapped. As described with reference to FIG. 8, the PPDU 901 may be transmitted using at least $N_G$ TX antennas ($N \geq N_G$). By subdividing the M subcarriers into $N_{TX}$ subcarrier groups 905 ($N_G = N_{TX}$), the BW parser 940 may ensure that all of the available TX antennas are utilized for open loop transmissions ($N=N_{TX}$).

The TX chains 960(1)-960($N_{TX}$) are configured to process modulated subcarriers, as RF signals, for transmission via the TX antennas 970(1)-970($N_{TX}$), respectively. More specifically, each of the TX chains 960(1)-960($N_{TX}$) may process a respective subset of the decorrelated subcarriers 906 based on the mapping performed by the PSD mapper 950. Example processing may include, among other examples, converting the frequency-domain subcarriers to time-domain samples (such as via an IFFT), adding a cyclic prefix to the timed-domain samples, converting the time-domain samples to a time-varying signal (such as via a DAC), up-converting the time-varying signal to RF signals (such as by mixing the time-varying signal with a signal or waveform oscillating at a carrier frequency), and amplifying the power of the RF signal (such as via a power amplifier).

Figure 10:
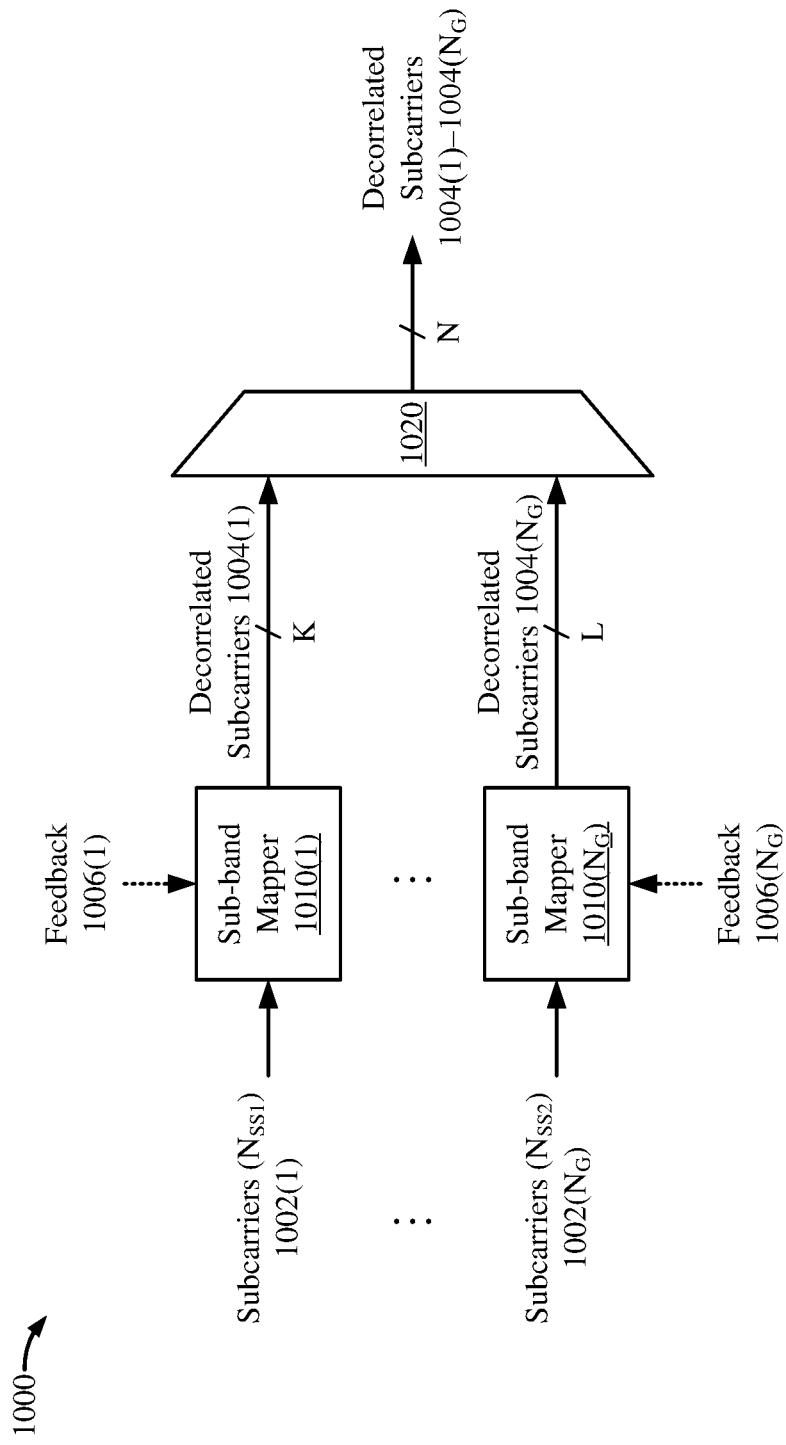
FIG. 10 shows a block diagram of an example antenna switching system, according to some implementations.

FIG. 10 shows a block diagram of an example antenna switching system 1000, according to some implementations. In some implementations, the antenna switching system 1000 may be one example of the PSD mapper 950 of FIG. 9. Thus, the antenna switching system 1000 may be configured to map a number ($N_G$) of groups of subcarriers 1002(1)-1002($N_G$) to a number (N) of TX antennas. With reference for example to FIG. 9, the groups of subcarriers 1002(1)-1002($N_G$) may be one example of the subcarrier groups 905. The antenna switching system 1000 includes $N_G$ sub-band mappers 1010(1)-1010($N_G$) and a multiplexer 1020.

Each of the sub-band mappers 1010(1)-1010($N_G$) is configured to map a respective group of subcarriers to one or more of the TX antennas. In some implementations, each of the sub-band mappers 1010(1)-1010($N_G$) may be one example of the PSD mapper 640 of FIG. 6. For example, the sub-band mapper 1010(1) may map the subcarriers 1002(1) to a number (K) of TX antennas based on a total number ($N_{TX}$) of available TX antennas and a number ($N_{SS1}$) of spatial streams modulated on the subcarriers 1002(1), where $N_{SS1} \leq K < N_{TX}$. Similarly, the sub-band mapper 1010($N_G$) may map the subcarriers 1002($N_G$) to a number (L) of TX antennas based on $N_{TX}$ and a number ($N_{SS2}$) of spatial streams modulated on the subcarriers 1002($N_G$), where $N_{SS2} \leq L < N_{TX}$.

The sub-band mappers 1010(1)-1010($N_G$) may produce decorrelated subcarriers 1004(1)-1004($N_G$) based on the mappings associated with the subcarriers 1002(1)-1002($N_G$), respectively. For example, the sub-band mapper 1010(1) may transform the subcarriers 1002(1) into K sets of decorrelated subcarriers 1004(1) and the sub-band mapper 1010($N_G$) may transform the subcarriers 1002($N_G$) into L sets of decorrelated subcarriers 1004($N_G$). In some implementations, the decorrelated subcarriers 1004(1)-1004($N_G$) may not include duplicate copies of any of the data modulated on the subcarriers 1002(1)-1002($N_G$) (such as where K=$N_{SS1}$ and L=$N_{SS2}$). In some other implementations, the decorrelated subcarriers 1004(1)-1004($N_G$) may include one or more duplicate copies of any of the data modulated on the subcarriers 1002(1)-1002($N_G$) (such as where K>$N_{SS1}$ or L>$N_{SS2}$).

In some aspects, the sub-band mappers 1010(1)-1010($N_G$) may randomly select the TX antennas to which the subcarriers 1002(1)-1002($N_G$) are mapped. In some other aspects, the sub-band mappers 1010(1)-1010($N_G$) may determine the TX antennas to be mapped to the subcarriers 1002(1)-1002($N_G$) based on a lookup table (or some predetermined procedure). In some implementations, the lookup table may indicate which of the TX antennas are to be used to transmit any given number of spatial streams. In some other implementations, the lookup table may store historical data associated with previous transmissions using various combinations of TX antennas. Example historical data may include, among other examples, an SNR or SINR associated with any subset or combination of the available TX antennas.

In some other aspects, the sub-band mappers 1010(1)-1010($N_G$) may receive feedback 1006(1)-1006($N_G$), respectively, from a receiving device and may select the TX antennas to be mapped to the subcarriers 1002(1)-1002($N_G$) based on the received feedback. In some implementations, the feedback 1006(1)-1006($N_G$) may identify the TX antennas to be mapped to each group of subcarriers 1002(1)-1002($N_G$). In some other implementations, the feedback 1006(1)-1006($N_G$) may include CSI associated with the subcarriers 1002(1)-1002($N_G$), respectively. In some implementations, each of the sub-band mappers 1010(1)-1010($N_G$) may select the TX antennas resulting in the highest processing SNR (or SINR) indicated by its received CSI. In some other implementations, each of the sub-band mappers 1010(1)-1010($N_G$) may select the TX antennas associated with the highest channel gains indicated by its received CSI.

In some other implementations, each of the sub-band mappers 1010(1)-1010($N_G$) may select at least the TX antenna associated with the highest channel gain indicated by the received CSI and may select any remaining TX antennas based on their degree of correlation with other selected TX antennas (such as described with reference to FIG. 6). Still further, in some implementations, each of the sub-band mappers 1010(1)-1010($N_G$) may select at least the TX antenna associated with the highest channel gain indicated by the received CSI and may select any remaining TX antennas based on their associated channel gains in directions orthogonal to other selected TX antennas (such as described with reference to FIG. 6).

In some other aspects, the sub-band mappers 1010(1)-1010($N_G$) may select the TX antennas to be mapped to the groups of subcarriers 1002(1)-1002($N_G$) based on any combination of factors described above. For example, the sub-band mapper 1010(1) may select the K TX antennas to be mapped to the subcarriers 1002(1) based on a lookup table or a random process and the sub-band mapper 1010($N_G$) may select the L TX antennas to be mapped to the subcarriers 1002($N_G$) based on feedback 1006($N_G$) received from the receiving device. In some implementations, the sub-band mappers 1010(1)-1010($N_G$) may utilize the feedback 1006(1)-1006($N_G$), respectively, for antenna selection whenever such feedback is available. In other words, any of the sub-band mappers 1010(1)-1010($N_G$) may utilize a lookup table or random process for antenna selection when feedback is not available for its group of subcarriers.

The multiplexer 1020 multiplexes the decorrelated subcarriers 1004(1)-1004($N_G$) onto N TX chains (such as any of the TX chains 960(1)-960($N_{TX}$) of FIG. 9) to be processed and transmitted via the N selected TX antennas, respectively. For example, the multiplexer 1020 may output the K sets of decorrelated subcarriers 1004(1) to K TX chains, respectively, of the N TX chains based on the mapping performed by the sub-band mapper 1010(1). More specifically, the K TX chains may be coupled to the K TX antennas selected by the sub-band mapper 1010(1). Similarly, the multiplexer 1020 may output the L sets of decorrelated subcarriers 1004($N_G$) to L TX chains, respectively, of the N TX chains based on the mapping performed by the sub-bad mapper 1010($N_G$). More specifically, the L TX chains may be coupled to the L TX antennas selected by the sub-band mapper 1010($N_G$).

As described with reference to FIG. 8, mapping different groups of subcarriers to different TX antennas causes each group of subcarriers to be transmitted over a different wireless channel. As a result, channel smoothing between subcarrier group boundaries may cause errors at the receiving device. In some implementations, the sub-band mappers 1010(1)-1010($N_G$) may add phase rotations or overlap-and-add (OLA) to the groups of subcarriers 1002(1)-1002($N_G$), respectively, to ensure coarse phase and amplitude continuity at the sub-band boundaries (such as to compensate for channel smoothing at the receiving device). For example, the sub-band mapper 1010(1) may determine a phase rotation (if any) to be applied to the subcarriers 1002(1) based on channel information included in the feedback 1006(1) (or measured implicitly). Similarly, the sub-band mapper 1010 ($N_G$) may determine a phase rotation (if any) to be applied to the subcarriers 1002($N_G$) based on channel information included in the feedback 1006($N_G$) (or measured implicitly).

In some aspects, the transmitter 900 may include additional elements or features not shown in FIG. 9. For example, the transmitter 900 may further include a FEC encoder that encodes the PPDU 901 to enable error detection (and correction) at the receiving device. More specifically, FEC may be performed prior to parsing the PPDU 901 into spatial streams 902(1)-902($N_{SS}$). Example suitable FEC encoders include LDPC encoders and BCC encoders, among other examples. When the PPDU 901 is BCC-encoded, the transmitter 900 may further include $N_{SS}$ interleavers that interleave the bits of the spatial streams 902(1)-902($N_{SS}$), respectively, to prevent long sequences of adjacent noisy bits from entering the BCC decoder (at the receiving device).

Figure 11:
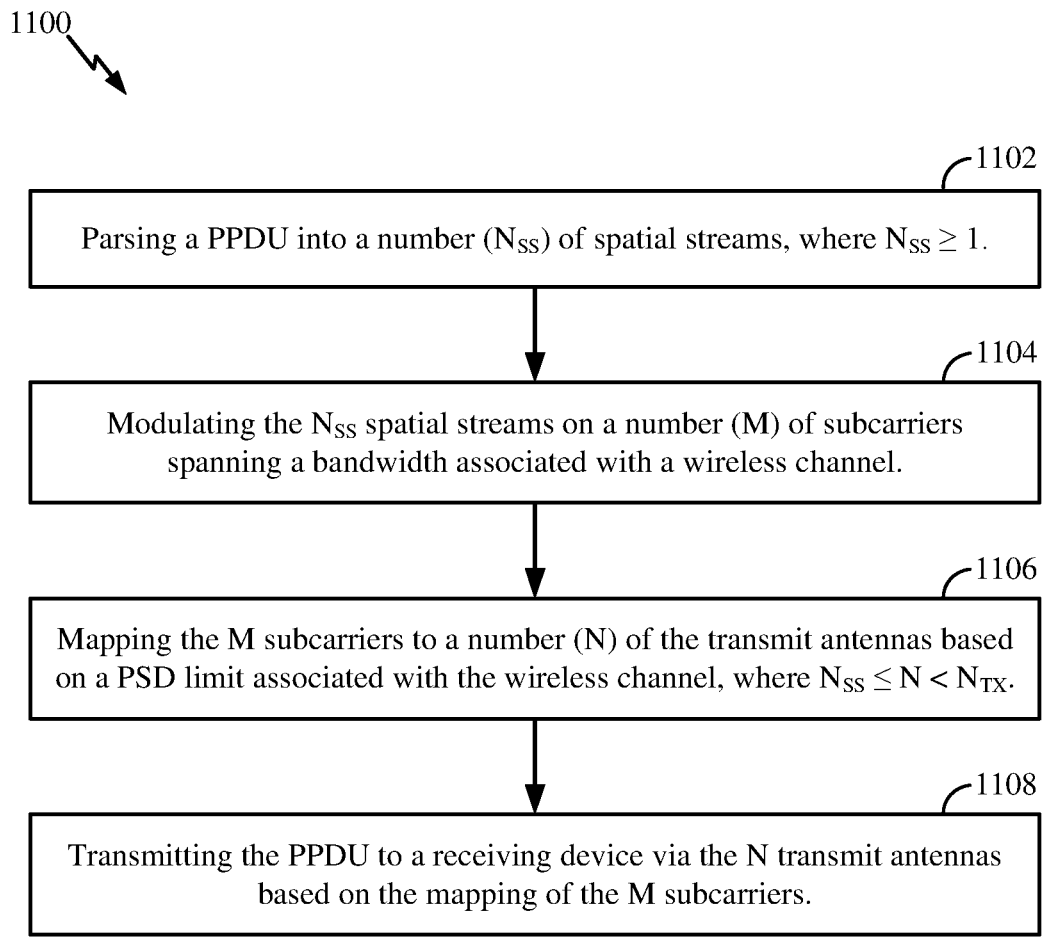
FIG. 11 shows a flowchart illustrating an example process for wireless communication that supports antenna switching in frequency bands with power spectral density (PSD) limits.

FIG. 11 shows a flowchart illustrating an example process 1100 for wireless communication that supports antenna switching in frequency bands with PSD limits. In some aspects, the process 1100 may be performed by a wireless communication device operating as or within an AP having a number ($N_{TX}$) of transmit antennas, such as any one of the APs 102 or 502 described above with reference to FIGS. 1 and 5A, respectively. In some other aspects, the process 1100 may be performed by a wireless communication device operating as or within a STA having $N_{TX}$ transmit antennas, such as any one of the STAs 104 or 504 described above with reference to FIGS. 1 and 5B, respectively.

In some implementations, the process 1100 begins in block 1102 with parsing a PPDU into a number ($N_{SS}$) of spatial streams, where $N_{SS} \geq 1$. In block 1104, the process 1100 proceeds with modulating the $N_{SS}$ spatial streams on a number (M) of subcarriers spanning a bandwidth associated with a wireless channel. In block 1106, the process 1100 proceeds with mapping the M subcarriers to a number (N) of the transmit antennas based on a PSD limit associated with the wireless channel, where $N_{SS} \leq N < N_{TX}$. In block 1108, the process 1100 proceeds with transmitting the PPDU to a receiving device via the N transmit antennas based on the mapping of the M subcarriers. In some implementations, N may be equal to $N_{SS}$.

In some aspects, the process 1100 may further include receiving antenna selection information from the receiving device indicating the N transmit antennas. In some other aspects, the mapping of the M subcarriers to the N transmit antennas may be further based on a lookup table that indicates the N transmit antennas to be used for transmitting $N_{SS}$ spatial streams. In some other aspects, the mapping of the M subcarriers to the N transmit antennas may be further based on a lookup table that stores historical data associated with previous transmissions by the wireless communication device.

Still further, in some aspects, the process 1100 may further include receiving CSI from the receiving device, where the M subcarriers are mapped to the N transmit antennas based on the received CSI. In some implementations, the N transmit antennas may be associated with the N highest SNRs or the N highest SINRs indicated by the received CSI. In some implementation, the N transmit antennas may be associated with the highest channel gains indicated by the received CSI.

In some implementations, the N transmit antennas may include a first transmit antenna associated with the highest channel gain indicated by the received CSI and a second transmit antenna having the lowest correlation, among the $N_{TX}$ transmit antennas, with the first transmit antenna. In some implementations, the N transmit antennas may further include a third transmit antenna having the lowest correlation, among the $N_{TX}$ transmit antennas, with the first and second transmit antennas.

In some implementations, the N transmit antennas may include a first transmit antenna associated with the highest channel gain indicated by the received CSI and a second transmit antenna associated with the highest channel gain, indicated by the received CSI, in a direction orthogonal to the first transmit antenna. In some implementations, the N transmit antennas may further include a third antenna having the highest channel gain, indicated by the received CSI, in a direction orthogonal to the first and second transmit antennas.

Figure 12:
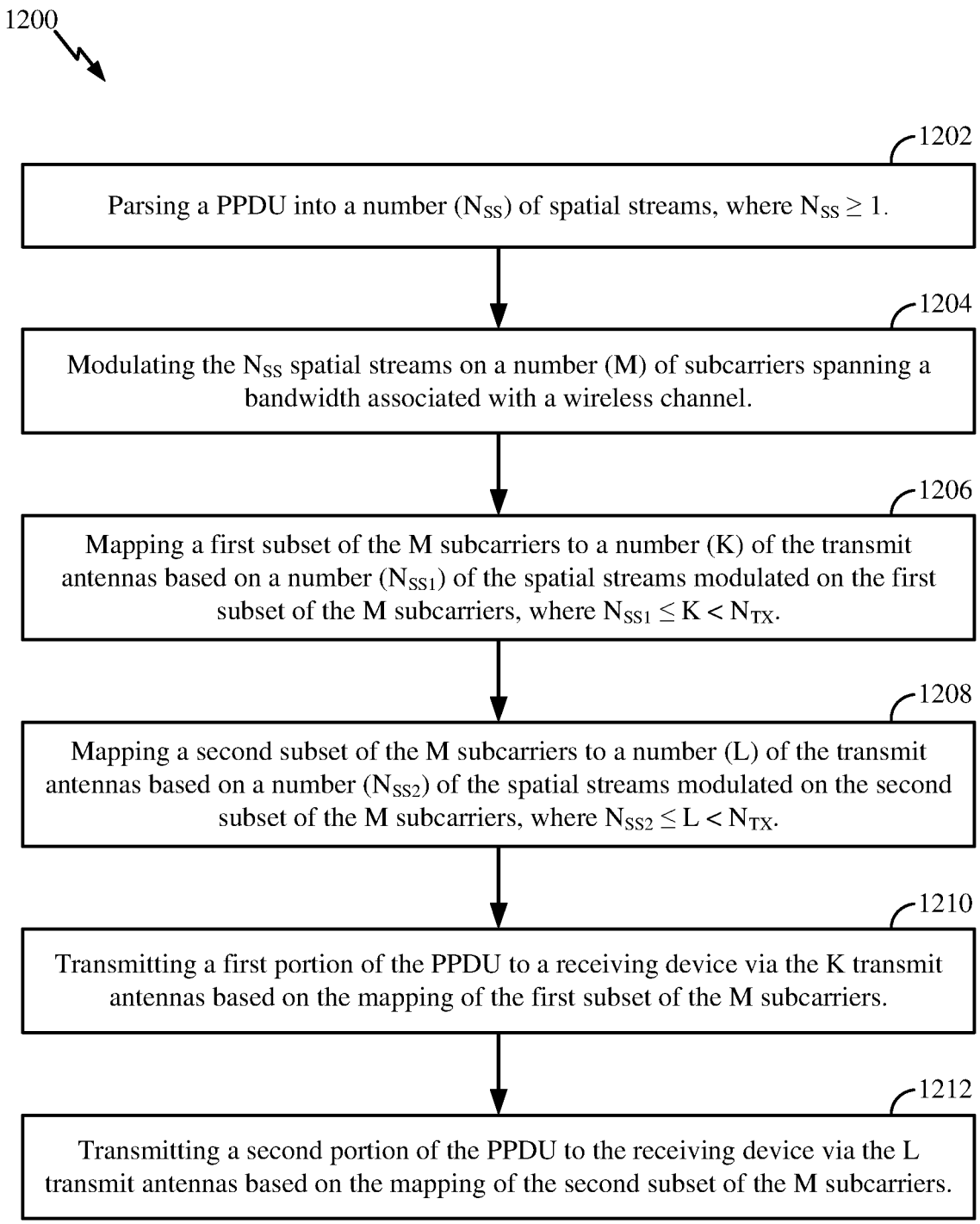
FIG. 12 shows a flowchart illustrating an example process for wireless communication that supports antenna switching in frequency bands with PSD limits.

FIG. 12 shows a flowchart illustrating an example process 1200 for wireless communication that supports antenna switching in frequency bands with PSD limits. In some aspects, the process 1200 may be performed by a wireless communication device operating as or within an AP having a number ($N_{TX}$) of transmit antennas, such as any one of the APs 102 or 502 described above with reference to FIGS. 1 and 5A, respectively. In some other aspects, the process 1200 may be performed by a wireless communication device operating as or within a STA having $N_{TX}$ transmit antennas, such as any one of the STAs 104 or 504 described above with reference to FIGS. 1 and 5B, respectively.

In some implementations, the process 1200 begins in block 1202 with parsing a PPDU into a number ($N_{SS}$) of spatial streams, where $N_{SS} \geq 1$. In block 1204, the process 1200 proceeds with modulating the $N_{SS}$ spatial streams on a number (M) of subcarriers spanning a bandwidth associated with a wireless channel. In block 1206, the process 1200 proceeds with mapping a first subset of the M subcarriers to a number (K) of the transmit antennas based on a number ($N_{SS1}$) of the spatial streams modulated on the first subset of the M subcarriers, where $N_{SS1} \leq K < N_{TX}$. In block 1208, the process 1200 proceeds with mapping a second subset of the M subcarriers to a number (L) of the transmit antennas based on a number ($N_{SS2}$) of the spatial streams modulated on the second subset of the M subcarriers, where $N_{SS2} \leq L < N_{TX}$. In block 1210, the process 1200 proceeds with transmitting a first portion of the PPDU to a receiving device via the K transmit antennas based on the mapping of the first subset of the M subcarriers. In block 1212, the process 1200 proceeds with transmitting a second portion of the PPDU to the receiving device via the L transmit antennas based on the mapping of the second subset of the M subcarriers.

In some implementations, K may be equal to $N_{SS1}$ and L may be equal to $N_{SS2}$. In some implementations, the K transmit antennas may be different than the L transmit antennas. In some implementations, the mapping of the first and second subsets of the M subcarriers to the K and L transmit antennas, respectively, may be further based on a PSD limit associated with the wireless channel.

In some implementations, subcarriers belonging to the first subset of the M subcarriers may be exclusive to the first subset and subcarriers belonging to the second subset of the M subcarriers may be exclusive to the second subset. In some implementations, the first subset of the M subcarriers may represent one or more first RUs and the second subset of the M subcarriers represents one or more second RUs. In some implementations, the first subset of the M subcarriers may include a different number of subcarriers than the second subset of the M subcarriers.

In some aspects, the process 1200 may further include receiving antenna selection information from the receiving device indicating the K transmit antennas or the L transmit antennas. In some other aspects, the mapping of the first or second subsets of the M subcarriers to the K or L transmit antennas, respectively, may be further based on a lookup table that indicates the K transmit antennas to be used for transmitting $N_{SS1}$ spatial streams and the L transmit antennas to be used for transmitting $N_{SS2}$ spatial streams. In some other aspects, the mapping of the first or second subsets of the M subcarriers to the K or L transmit antennas, respectively, may be further based on a lookup table that stores historical data associated with previous transmissions by the wireless communication device.

Still further, in some aspects, the process 1200 may further include receiving CSI from the receiving device, where the mapping of the first or second subsets of the M subcarriers to the K or L transmit antennas, respectively, is further based on the received CSI. In some implementations, the mapping of the first subset of the M subcarriers to the K transmit antennas may be based on a lookup table and the mapping of the second subset of the M subcarriers to the L transmit antennas may be based on the received CSI.

In some implementations, the process 1200 may further include mapping a third subset of the M subcarriers to a number (J) of the transmit antennas based on a number ($N_{SS3}$) of the spatial streams modulated on the third subset of the M subcarriers, where $N_{SS3} \leq J < N_{TX}$; and transmitting a third portion of the PPDU to a receiving device via the J transmit antennas based on the mapping of the third subset of the M subcarriers.

Figure 13:
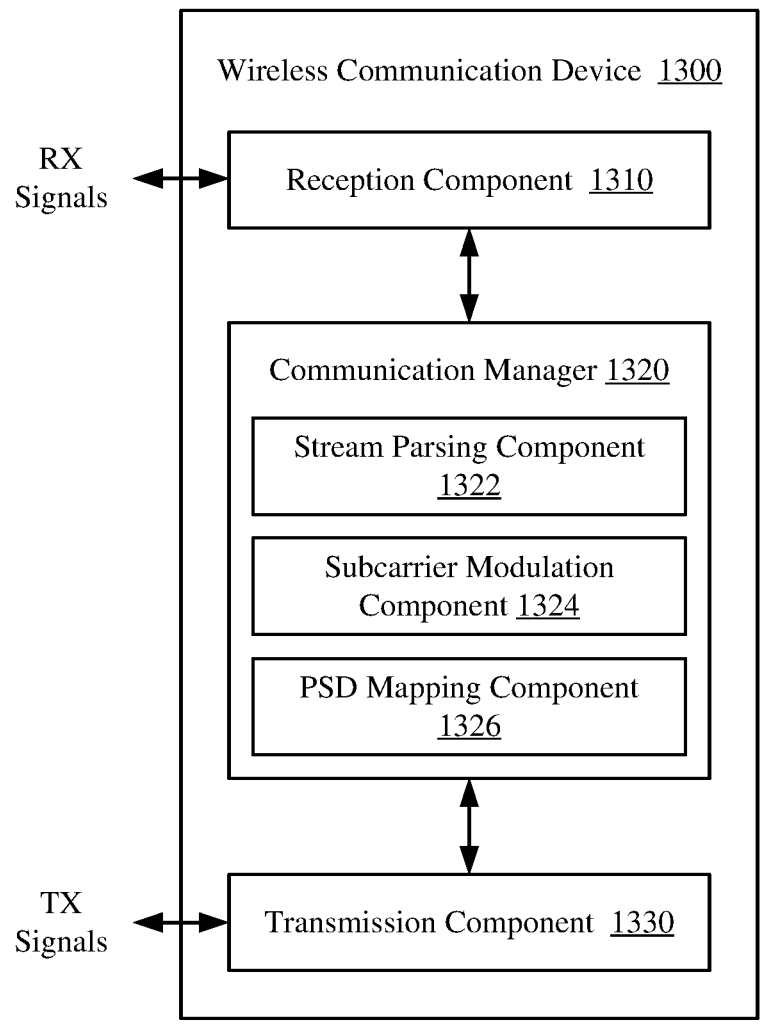
FIG. 13 shows a block diagram of an example wireless communication device according to some implementations.

FIG. 13 shows a block diagram of an example wireless communication device 1300 according to some implementations. In some implementations, the wireless communication device 1300 is configured to perform the process 1100 described with reference to FIG. 11. The wireless communication device 1300 can be an example implementation of the wireless communication device 400 described above with reference to FIG. 4. For example, the wireless communication device 1300 can be a chip, SoC, chipset, package or device that includes at least one processor and at least one modem (for example, a Wi-Fi (IEEE 802.11) modem or a cellular modem).

The wireless communication device 1300 includes a reception component 1310, a communication manager 1320, and a transmission component 1330. The communication manager 1320 further includes a stream parsing component 1322, a subcarrier modulation component 1324, and a PSD mapping component 1326. Portions of one or more of the components 1322, 1324, and 1326 may be implemented at least in part in hardware or firmware. In some implementations, at least some of the components 1322, 1324, or 1326 are implemented at least in part as software stored in a memory (such as the memory 408). For example, portions of one or more of the components 1322, 1324, and 1326 can be implemented as non-transitory instructions (or "code") executable by a processor (such as the processor 406) to perform the functions or operations of the respective component.

The reception component 1310 is configured to receive RX signals, over a wireless channel, from one or more other wireless communication devices. The transmission component 1330 is configured to transmit TX signals, over a wireless channel, to one or more other wireless communication devices. In some implementations, the transmission component 1330 may include, or may be coupled to, a number ($N_{TX}$) of transmit antennas. The communication manager 1320 is configured to control or manage communications with one or more other wireless communication devices. In some implementations, the stream parsing component 1322 may parse a PPDU into a number ($N_{SS}$) of spatial streams, where $N_{SS} \geq 1$; the subcarrier modulation component 1324 may modulate the $N_{SS}$ spatial streams on a number (M) of subcarriers spanning a bandwidth associated with a wireless channel; and the PSD mapping component 1326 may map the M subcarriers to a number (N) of the transmit antennas based on a PSD limit associated with the wireless channel, where $N_{SS} \leq N < N_{TX}$. In some implementations, the transmission component 1330 may transmit the PPDU to a receiving device via the N transmit antennas based on the mapping of the M subcarriers.

Figure 14:
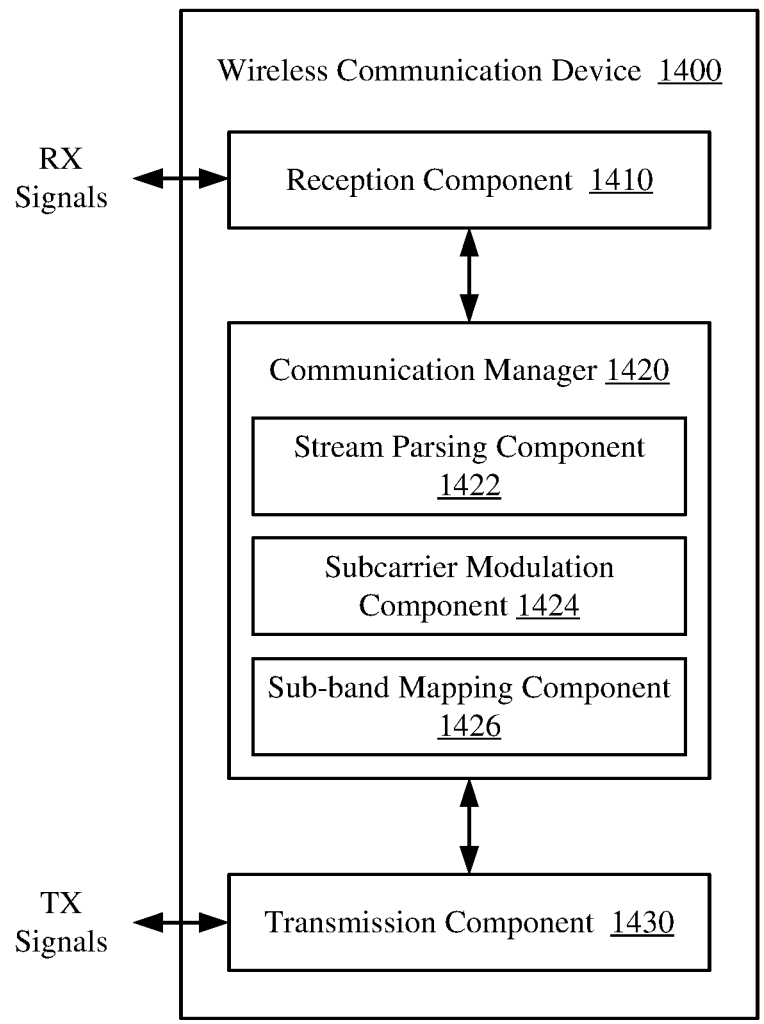
FIG. 14 shows a block diagram of an example wireless communication device according to some implementations.

FIG. 14 shows a block diagram of an example wireless communication device 1400 according to some implementations. In some implementations, the wireless communication device 1400 is configured to perform the process 1100 described with reference to FIG. 11. The wireless communication device 1400 can be an example implementation of the wireless communication device 400 described above with reference to FIG. 4. For example, the wireless communication device 1400 can be a chip, SoC, chipset, package or device that includes at least one processor and at least one modem (for example, a Wi-Fi (IEEE 802.11) modem or a cellular modem).

The wireless communication device 1400 includes a reception component 1410, a communication manager 1420, and a transmission component 1430. The communication manager 1420 further includes a stream parsing component 1422, a subcarrier modulation component 1424, and a sub-band mapping component 1426. Portions of one or more of the components 1422, 1424, and 1426 may be implemented at least in part in hardware or firmware. In some implementations, at least some of the components 1422, 1424, or 1426 are implemented at least in part as software stored in a memory (such as the memory 408). For example, portions of one or more of the components 1422, 1424, and 1426 can be implemented as non-transitory instructions (or "code") executable by a processor (such as the processor 406) to perform the functions or operations of the respective component.

The reception component 1410 is configured to receive RX signals, over a wireless channel, from one or more other wireless communication devices. The transmission component 1430 is configured to transmit TX signals, over a wireless channel, to one or more other wireless communication devices. In some implementations, the transmission component 1430 may include, or may be coupled to, a number ($N_{TX}$) of transmit antennas. The communication manager 1420 is configured to control or manage communications with one or more other wireless communication devices. In some implementations, the stream parsing component 1422 may parse a PPDU into a number ($N_{SS}$) of spatial streams, where $N_{SS} \geq 1$; the subcarrier modulation component 1424 may modulate the $N_{SS}$ spatial streams on a number (M) of subcarriers spanning a bandwidth associated with a wireless channel; and the sub-band mapping component 1426 may map a first subset of the M subcarriers to a number (K) of the transmit antennas based on a number ($N_{SS1}$) of the spatial streams modulated on the first subset of the M subcarriers, where $N_{SS1} \leq K < N_{TX}$, and may map a second subset of the M subcarriers to a number (L) of the transmit antennas based on a number ($N_{SS2}$) of the spatial streams modulated on the second subset of the M subcarriers, where $N_{SS2} \leq L < N_{TX}$. In some implementations, the transmission component 1430 may transmit a first portion of the PPDU to a receiving device via the K transmit antennas based on the mapping of the first subset of the M subcarriers and may transmit a second portion of the PPDU to the receiving device via the L transmit antennas based on the mapping of the second subset of the M subcarriers.

Implementation examples are described in the following numbered clauses:

1. A method for wireless communication by a wireless communication device having a number ($N_{TX}$) of transmit antennas, including:
   parsing a physical layer (PHY) protocol data unit (PPDU) into a number (NSS) of spatial streams, where $N_{SS} \geq 1$;
   modulating the NSS spatial streams on a number (M) of subcarriers spanning a bandwidth associated with a wireless channel;
   mapping the M subcarriers to a number (N) of the transmit antennas based on a power spectral density (PSD) limit associated with the wireless channel, where NSS≤N<NTX; and
   transmitting the PPDU to a receiving device via the N transmit antennas based on the mapping of the M subcarriers.

2. The method of clause 1, where $N=N_{SS}$.

3. The method of any of clauses 1-3, where the mapping of the M subcarriers to the N transmit antennas is further based on a lookup table that indicates the N transmit antennas to be used for transmitting $N_{SS}$ spatial streams.

4. The method of any of clauses 1-3, where the mapping of the M subcarriers to the N transmit antennas is further based on a lookup table that stores historical data associated with previous transmissions by the wireless communication device.

5. The method of any of clauses 1-3, further including:
   receiving channel state information (CSI) from the receiving device, the M subcarriers being mapped to the N transmit antennas based on the received CSI.

6. The method of any of clauses 1-3 or 5, where the N transmit antennas are associated with the N highest signal-to-noise ratios (SNR) or the N highest signal-to-interference-plus-noise ratios (SINRs) indicated by the received CSI.

7. The method of any of clauses 1-3 or 5, where the N transmit antennas are associated with the highest channel gains indicated by the received CSI.

8. The method of any of clauses 1-3 or 5, where the N transmit antennas include a first transmit antenna associated with the highest channel gain indicated by the received CSI and a second transmit antenna having the lowest correlation, among the $N_{TX}$ transmit antennas, with the first transmit antenna.

9. The method of any of clauses 1-3, 5, or 8, where the N transmit antennas further include a third transmit antenna having the lowest correlation, among the $N_{TX}$ transmit antennas, with the first and second transmit antennas.

10. The method of any of clauses 1-3 or 5, where the N transmit antennas include a first transmit antenna associated with the highest channel gain indicated by the received CSI and a second transmit antenna associated with the highest channel gain, indicated by the received CSI, in a direction orthogonal to the first transmit antenna.

11. The method of any of clauses 1-3, 5, or 10, where the N transmit antennas further include a third transmit antenna having the highest channel gain, indicated by the received CSI, in a direction orthogonal to the first and second transmit antennas.

12. The method of any of clauses 1-3, further including:
   receiving antenna selection information from the receiving device indicating the N transmit antennas.

13. A wireless communication device including:
   a number ($N_{TX}$) of transmit antennas;
   at least one memory; and
   at least one processor communicatively coupled with the at least one memory, the at least one processor configured to cause the wireless communication device to perform the method of any one or more of clauses 1-12.

14. A method for wireless communication by a wireless communication device having a number ($N_{TX}$) of transmit antennas, including:
   parsing a physical layer (PHY) protocol data unit (PPDU) into a number (NSS) of spatial streams, where NSS≥1;
   modulating the NSS spatial streams on a number (M) of subcarriers spanning a bandwidth associated with a wireless channel;
   mapping a first subset of the M subcarriers to a number (K) of the transmit antennas based on a number (NSS1) of the spatial streams modulated on the first subset of the M subcarriers, where NSS1≤K<NTX;
   mapping a second subset of the M subcarriers to a number (L) of the transmit antennas based on a number (NSS2) of the spatial streams modulated on the second subset of the M subcarriers, where NSS2≤L<NTX;
   transmitting a first portion of the PPDU to a receiving device via the K transmit antennas based on the mapping of the first subset of the M subcarriers; and
   transmitting a second portion of the PPDU to the receiving device via the L transmit antennas based on the mapping of the second subset of the M subcarriers.

15. The method of clause 14, where $K=N_{SS1}$ and $L=N_{SS2}$.

16. The method of any of clauses 14 or 15, where the K transmit antennas are different than the L transmit antennas.

17. The method of any of clauses 14-17, where the mapping of the first and second subsets of the M subcarriers to the K and L transmit antennas, respectively, is further based on a power spectral density (PSD) limit associated with the wireless channel.

18. The method of any of clauses 14-18, where subcarriers belonging to the first subset of the M subcarriers are exclusive to the first subset and subcarriers belonging to the second subset of the M subcarriers are exclusive to the second subset.

19. The method of any of clauses 14-19, where the first subset of the M subcarriers represents one or more first resource units (RUs) and the second subset of the M subcarriers represents one or more second RUs.

20. The method of any of clauses 14-20, where the first subset of the M subcarriers includes a different number of subcarriers than the second subset of the M subcarriers.

21. The method of any of clauses 14-21, where the mapping of the first or second subsets of the M subcarriers to the K or L transmit antennas, respectively, is further based on a lookup table that indicates the K transmit antennas to be used for transmitting $N_{SS1}$ spatial streams and the L transmit antennas to be used for transmitting $N_{SS2}$ spatial streams.

22. The method of any of clauses 14-21, where the mapping of the wherein the mapping of the first or second subsets of the M subcarriers to the K or L transmit antennas, respectively, is further based on a lookup table that stores historical data associated with previous transmissions by the wireless communication device.

23. The method of any of clauses 14-21, further including:
receiving channel state information (CSI) from the receiving device, the mapping of the first or second subsets of the M subcarriers to the K or L transmit antennas, respectively, being further based on the received CSI.

24. The method of any of clauses 14-21 or 23, where the mapping of the first subset of the M subcarriers to the K transmit antennas is based on a lookup table and the mapping of the second subset of the M subcarriers to the L transmit antennas is based on the received CSI.

25. The method of any of clauses 14-21, further including:
receiving antenna selection information from the receiving device indicating the K transmit antennas or the L transmit antennas.

26. The method of any of clauses 14-25, further including:
mapping a third subset of the M subcarriers to a number (J) of the transmit antennas based on a number ($N_{SS3}$) of the spatial streams modulated on the third subset of the M subcarriers, where $N_{SS3} \leq J < N_{TX}$; and transmitting a third portion of the PPDU to a receiving device via the J transmit antennas based on the mapping of the third subset of the M subcarriers.

27. A wireless communication device including:
a number ($N_{TX}$) of transmit antennas;
at least one memory; and
at least one processor communicatively coupled with the at least one memory, the at least one processor configured to cause the wireless communication device to perform the method of any one or more of clauses 14-26.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c. As used herein, "based on" is intended to be interpreted in the inclusive sense, unless otherwise explicitly indicated. For example, "based on" may be used interchangeably with "based at least in part on," unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication performed by a wireless communication device having a number ($N_{TX}$) of transmit antennas, comprising:
parsing a physical layer (PHY) protocol data unit (PPDU) into a number ($N_{SS}$) of spatial streams, where $N_{SS} \geq 1$;
modulating the $N_{SS}$ spatial streams on a number (M) of subcarriers spanning a bandwidth associated with a wireless channel;
mapping the M subcarriers to a number (N) of the transmit antennas based on a power spectral density (PSD) limit associated with the wireless channel, where $N_{SS} \leq N < N_{TX}$; and
transmitting the PPDU to a receiving device via the N transmit antennas based on the mapping of the M subcarriers.

2. The method of claim 1, wherein $N=N_{SS}$.

3. The method of claim 1, wherein the mapping of the M subcarriers to the N transmit antennas is further based on a lookup table that indicates the N transmit antennas to be used for transmitting $N_{SS}$ spatial streams.

4. The method of claim 1, wherein the mapping of the M subcarriers to the N transmit antennas is further based on a lookup table that stores historical data associated with previous transmissions by the wireless communication device.

5. The method of claim 1, further comprising:
receiving channel state information (CSI) from the receiving device, the M subcarriers being mapped to the N transmit antennas based on the received CSI.

6. The method of claim 5, wherein the N transmit antennas are associated with an N highest signal-to-noise ratios (SNRs) or an N highest signal-to-interference-plus-noise ratio (SINRs) indicated by the received CSI.

7. The method of claim 5, wherein the N transmit antennas are associated with an N highest channel gains indicated by the received CSI.

8. The method of claim 5, wherein the N transmit antennas include a first transmit antenna associated with a highest channel gain indicated by the received CSI and a second transmit antenna having a lowest correlation, among the NIX transmit antennas, with the first transmit antenna.

9. The method of claim 8, wherein the N transmit antennas further include a third transmit antenna having the lowest correlation, among the NIX transmit antennas, with the first and second transmit antennas.

10. The method of claim 5, wherein the N transmit antennas include a first transmit antenna associated with a highest channel gain indicated by the received CSI and a second transmit antenna associated with the highest channel gain, indicated by the received CSI, in a direction orthogonal to the first transmit antenna.

11. The method of claim 10, wherein the N transmit antennas further include a third transmit antenna having the highest channel gain, indicated by the received CSI, in a direction orthogonal to the first and second transmit antennas.

12. The method of claim 1, further comprising:
receiving antenna selection information from the receiving device indicating the N transmit antennas.

13. A wireless communication device comprising:
a number ($N_{TX}$) of transmit antennas;
at least one memory; and
at least one processor communicatively coupled with the at least one memory, the at least one processor configured to cause the wireless communication device to:
parse a physical layer (PHY) convergence protocol (PLCP) protocol data unit (PPDU) into a number ($N_{SS}$) of spatial streams, where $N_{SS} \geq 1$;
modulate the $N_{SS}$ spatial streams on a number (M) of subcarriers spanning a bandwidth associated with a wireless channel;
map the M subcarriers to a number (N) of the transmit antennas based on a power spectral density (PSD) limit associated with the wireless channel, where $N_{SS} \leq N < N_{TX}$; and
transmit the PPDU to a receiving device via the N transmit antennas based on the mapping of the M subcarriers.

14. The wireless communication device of claim 13, wherein the mapping of the M subcarriers to the N transmit antennas is further based on a lookup table.

15. The wireless communication device of claim 13, wherein the at least one processor is further configured to cause the wireless communication device to:
receive channel state information (CSI) from the receiving device, the M subcarriers being mapped to the N transmit antennas based on the received CSI.

16. A method for wireless communication performed by a wireless communication device having a number ($N_{TX}$) of transmit antennas, comprising:
parsing a physical layer (PHY) protocol data unit (PPDU) into a number ($N_{SS}$) of spatial streams, where $N_{SS} \geq 1$;
modulating the $N_{SS}$ spatial streams on a number (M) of subcarriers spanning a bandwidth associated with a wireless channel;

mapping a first subset of the M subcarriers to a number (K) of the transmit antennas based on a number ($N_{SS1}$) of the spatial streams modulated on the first subset of the M subcarriers, where $N_{SS} \leq K < N_{TX}$;
mapping a second subset of the M subcarriers to a number (L) of the transmit antennas based on a number ($N_{SS2}$) of the spatial streams modulated on the second subset of the M subcarriers, where $N_{SS2} \leq L < N_{TX}$;
transmitting a first portion of the PPDU to a receiving device via the K transmit antennas based on the mapping of the first subset of the M subcarriers; and
transmitting a second portion of the PPDU to the receiving device via the L transmit antennas based on the mapping of the second subset of the M subcarriers.

17. The method of claim 16, wherein $K=N_{SS1}$ and $L=N_{SS2}$.

18. The method of claim 16, wherein the K transmit antennas are different than the L transmit antennas.

19. The method of claim 16, wherein the mapping of the first and second subsets of the M subcarriers to the K and L transmit antennas, respectively, is further based on a power spectral density (PSD) limit associated with the wireless channel.

20. The method of claim 16, wherein subcarriers belonging to the first subset of the M subcarriers are exclusive to the first subset and subcarriers belonging to the second subset of the M subcarriers are exclusive to the second subset.

21. The method of claim 16, wherein the first subset of the M subcarriers represents one or more first resource units (RUs) and the second subset of the M subcarriers represents one or more second RUs.

22. The method of claim 16, wherein the first subset of the M subcarriers includes a different number of subcarriers than the second subset of the M subcarriers.

23. The method of claim 16, wherein the mapping of the first or second subsets of the M subcarriers to the K or L transmit antennas, respectively, is further based on a lookup table that indicates the K transmit antennas to be used for transmitting $N_{SS1}$ spatial streams and the L transmit antennas to be used for transmitting $N_{SS2}$ spatial streams.

24. The method of claim 16, wherein the mapping of the wherein the mapping of the first or second subsets of the M subcarriers to the K or L transmit antennas, respectively, is further based on a lookup table that stores historical data associated with previous transmissions by the wireless communication device.

25. The method of claim 16, further comprising:
receiving channel state information (CSI) from the receiving device, the mapping of the first or second subsets of the M subcarriers to the K or L transmit antennas, respectively, being further based on the received CSI.

26. The method of claim 25, wherein the mapping of the first subset of the M subcarriers to the K transmit antennas is based on a lookup table and the mapping of the second subset of the M subcarriers to the L transmit antennas is based on the received CSI.

27. The method of claim 16, further comprising:
receiving antenna selection information from the receiving device indicating the K transmit antennas or the L transmit antennas.

28. The method of claim 16, further comprising:
mapping a third subset of the M subcarriers to a number (J) of the transmit antennas based on a number ($N_{SS3}$) of the spatial streams modulated on the third subset of the M subcarriers, where $N_{SS3} \leq J < N_{TX}$; and transmitting a third portion of the PPDU to a receiving device via the J transmit antennas based on the mapping of the third subset of the M subcarriers.

29. A wireless communication device comprising:
a number ($N_{TX}$) of transmit antennas;
at least one memory; and
at least one processor communicatively coupled with the at least one memory, the at least one processor configured to cause the wireless communication device to:
parse a physical layer (PHY) convergence protocol (PLCP) protocol data unit (PPDU) into a number ($N_{SS}$) of spatial streams, where $N_{SS} \geq 1$;
modulate the $N_{SS}$ spatial streams on a number (M) of subcarriers spanning a bandwidth associated with a wireless channel;
map a first subset of the M subcarriers to a number (K) of the transmit antennas based on a number ($N_{SS1}$) of the spatial streams modulated on the first subset of the M subcarriers, where $N_{SS1} \leq K < N_{TX}$;
map a second subset of the M subcarriers to a number (L) of the transmit antennas based on a number ($N_{SS2}$) of the spatial streams modulated on the second subset of the M subcarriers, where $N_{SS2} \leq L < N_{TX}$;
transmit a first portion of the PPDU to a receiving device via the K transmit antennas based on the mapping of the first subset of the M subcarriers; and
transmit a second portion of the PPDU to the receiving device via the L transmit antennas based on the mapping of the second subset of the M subcarriers.

30. The wireless communication device of claim 29, wherein the first subset of the M subcarriers does not overlap the second subset of the M subcarriers.

\* \* \* \* \*